(12) United States Patent
Diaz

(10) Patent No.: US 6,298,603 B1
(45) Date of Patent: *Oct. 9, 2001

(54) ACCESS CONTROL VESTIBULE

(76) Inventor: William Diaz, P.O. Box 1149, Trujillo Alto, PR (US) 00977

( * ) Notice: Subject to any disclaimer, the term of this patent is extended or adjusted under 35 U.S.C. 154(b) by 0 days.

This patent is subject to a terminal disclaimer.

(21) Appl. No.: 09/437,693

(22) Filed: Nov. 10, 1999

Related U.S. Application Data

(63) Continuation of application No. 08/780,100, filed on Feb. 11, 1997, now Pat. No. 5,992,094.

(51) Int. Cl.[7] .................................. E06B 7/00; E05G 5/00
(52) U.S. Cl. ......................................... 49/68; 109/3; 109/6
(58) Field of Search ................................. 109/2–9; 49/25, 49/68, 29, 30, 31

(56) References Cited

U.S. PATENT DOCUMENTS

| | | |
|---|---|---|
| 1,216,345 | 2/1917 | Mirau . |
| 1,797,511 | 3/1931 | Mensik . |
| 2,397,754 | 4/1946 | Sawyer . |
| 2,758,835 | 8/1956 | Wikkerink . |
| 2,772,901 | 12/1956 | Roethel . |
| 3,174,193 | 3/1965 | Smith . |
| 3,453,019 | 7/1969 | Carr . |
| 3,669,038 | 6/1972 | Watson . |

(List continued on next page.)

FOREIGN PATENT DOCUMENTS

| | | |
|---|---|---|
| 0268924 | 6/1988 | (FR) . |
| 08077475 * | 8/1997 | (JP) ................................ G01H/1/00 |
| 09218272 * | 8/1997 | (JP) ................................ G01H/1/00 |

OTHER PUBLICATIONS

Quake Alarm Earthquake Detector System.*

*Primary Examiner*—Jerry Redman
*Assistant Examiner*—Curtis A. Cohen
(74) *Attorney, Agent, or Firm*—Nils H. Ljungman & Associates

(57) ABSTRACT

An access control chamber security system with a security chamber having an aluminum frame and an entrance door and an exit door, a metal detector located within the access control chamber to detect a weapon being carried within the chamber, locks on the doors and control means to prevent the doors from being opened at the same time or prevent the exit door from opening when a weapon is detected, and including improvements such as a side frame member with a cutout section having an insulated member placed therein to provide an open electrical loop in the side frame member, the metal detector having a plurality of coils located in a plurality of zones, a three second time delay from when the manually operated exit door is opened to when the lock on the exit door is re-activated, ballistic fiberglass disposed within a hollow section of the aluminum frame members, floor contact pads with nitrogen disposed within the pads surrounding the metal plates formed therein, a floor contact pad having a plurality of induction coils therein to act as a metal detector for a weapon placed on the floor, a vibration sensor or seismic detector associated with the controls of the access control chamber system to unlock the doors in the event of an earthquake or a bomb explosion, and the lock box covering up the magnetic locks having bullet-resistant capabilities. The vibration sensor includes a magnet hanging from a thin wire, and in close proximity to a normally opened contact switch such that displacement of the magnet closes the contact switch.

20 Claims, 22 Drawing Sheets

U.S. PATENT DOCUMENTS

| | | |
|---|---|---|
| 3,924,546 | 12/1975 | Pretini . |
| 3,938,282 | 2/1976 | Goyal . |
| 3,965,827 | 6/1976 | Reeves . |
| 3,990,039 | 11/1976 | Miller . |
| 4,011,686 | 3/1977 | Jet, III et al. . |
| 4,060,039 | 11/1977 | Lagarrigue . |
| 4,297,690 * | 10/1981 | Baker ................................... 340/690 |
| 4,308,803 | 1/1982 | Pretini . |
| 4,375,735 | 3/1983 | Rhoads . |
| 4,390,922 * | 6/1983 | Pelliccia ............................... 361/170 |
| 4,433,528 | 2/1984 | Bohman . |
| 4,462,094 | 7/1984 | Bowden et al. . |
| 4,481,887 | 11/1984 | Urbano . |
| 4,586,441 | 5/1986 | Zekich . |
| 4,598,495 | 7/1986 | Labarile . |
| 4,656,954 | 4/1987 | Tonali . |
| 4,689,997 * | 9/1987 | Windisch ............................... 73/652 |
| 4,741,275 | 5/1988 | Lewiner et al. . |
| 4,945,347 * | 7/1990 | Perry ..................................... 340/689 |
| 5,044,460 | 9/1991 | Kamata et al. . |
| 5,088,741 | 2/1992 | Simonetti . |
| 5,195,448 | 3/1993 | Sims . |
| 5,252,786 * | 10/1993 | Rinard .................................. 181/122 |
| 5,311,166 | 5/1994 | Frye . |
| 5,450,651 | 9/1995 | Coleman et al. . |
| 5,475,372 * | 12/1995 | Burke .................................... 340/690 |
| 5,644,236 | 7/1997 | Strosser et al. . |
| 5,694,867 | 12/1997 | Diaz-Lopez . |

* cited by examiner

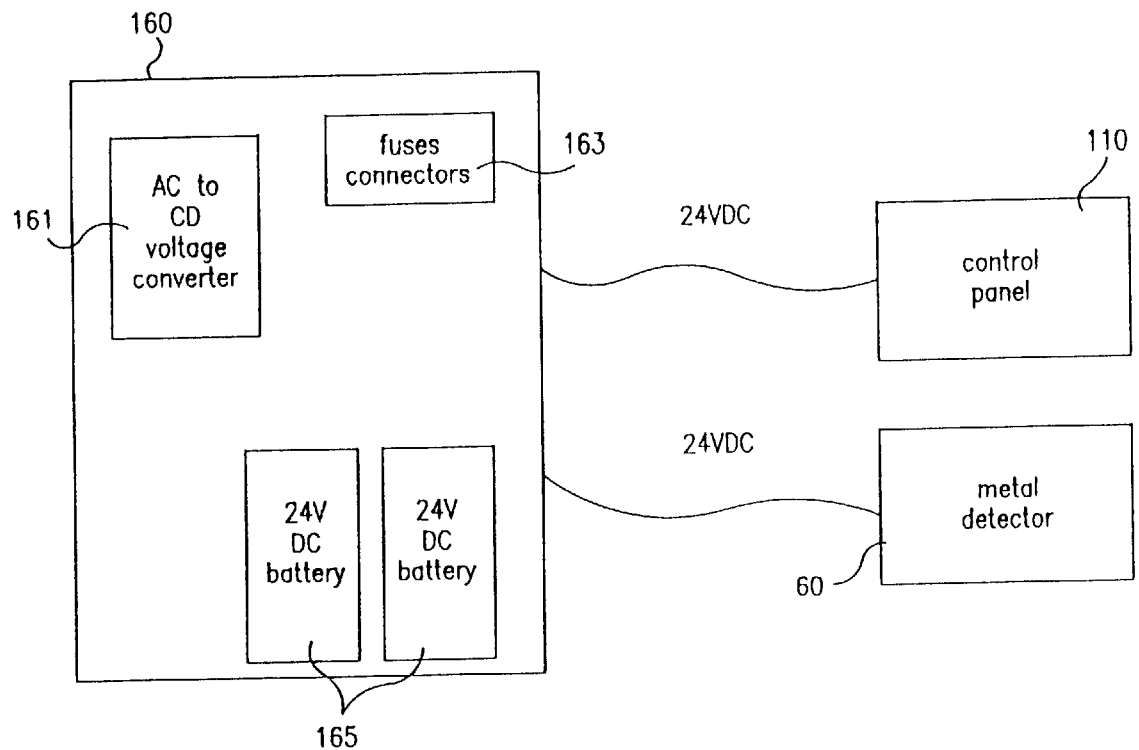
FIG. 11
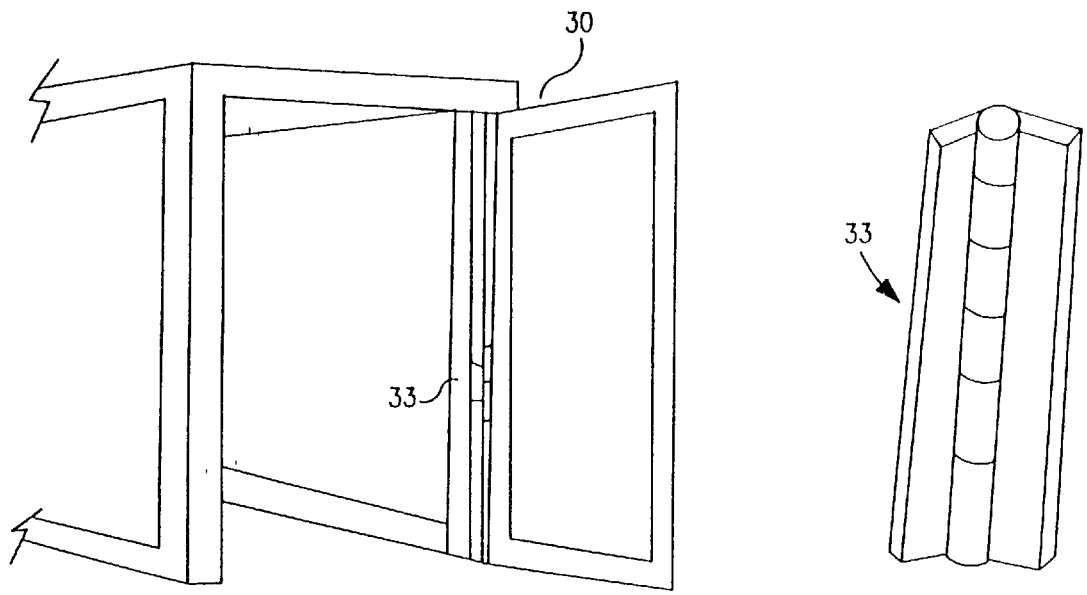
FIG. 12a
FIG. 12b

ACCESS CONTROL VESTIBULE

This application is a continuation of U.S. Ser. No. 08/780,100, filed Feb. 11, 1997, now U.S. Pat. No. 5,992,094.

FIELD OF THE INVENTION

This invention relates to security access systems for banks or the like which satisfy fire department regulations, handicapped regulations, and which also meets the needs of the bank for reasonably rapid access and the prevention of robberies. The access control vestibule makes use of multiple security doors which lock to prevent more than one door from opening at a time, and to prevent the inner-most door from opening when a weapon such as a gun is detected by a metal detector.

BACKGROUND OF THE INVENTION

Banks are becoming easy prey for robbers because of their usually easy access from the streets. Reported robberies have gone from about 150 in 1930 to about 10,000 in each of the years 1990, 1991 and 1992. More worrisome to banks than the loss of cash is the potential trauma inflicted on its customers when an armed robbery takes place. In the Los Angeles area alone—where 25% of all bank robberies takes place—43 robberies involved shots being fired and 64 assaults were reported in 1992. Thus, the use of gun fire is increasing greatly.

These statistics indicate the need for sophisticated security precautions for banks, such as access control systems. Some common access control security systems are suggested in U.S. Pat. Nos. 5,195,448, to Sims U.S. Pat. No. 4,556,954 to Tonali, and U.S. Pat. No. 4,481,887 to Urbano. These and other common access control chamber systems, have significant problems which allow criminals who plan around the system to enter the secured building with a weapon.

In one example of a method a criminal could use to evade a common access control chamber system, a would-be bank robber can open the outer entry door and throw a weapon between the metal detector panels without activating the unit, proceed to the second entry door pick up the weapon and enter the bank. Another means of evading a common access control chamber systems uses two banks robbers who enter the outer entry door together. The first robber, who has no weapon, then proceeds to the second entry door while the second robber who has a hidden weapon, straddles the entryway putting his feet on the metal framing, waits for the first robber to open the second entry door, and then both enter the bank. In yet another method of evading a common access control chamber system, a would be bank robber would proceed inside the entry chamber, activate the metal detector, drop his weapon on the floor, exit the chamber through first entry door, wait for operator to reset the system, and then re-enter, pick-up his weapon and enter the bank. Finally, a common access control chamber system could be evaded if while a customer was exiting from a chamber an armed robber entered the bank through the exit outer door chamber and leaves a weapon for a second rubber who is unarmed standing by the inner exit door. The second robber would then open the inner exit door and pick up the weapon. These and other methods of evading common access control chamber security systems render common access control chamber systems partially effective.

Protective door systems of the type which provides some degree of protection and security for banks and similar office environments are well known in the art. One well known device of this type (U.S. Pat. No. 4,060,039 to Lagarrigue) shows a security system having embodiments with a circular or a rectangular shape, the rectangular shaped embodiment having a side-by-side entrance and exit chamber each with an entrance door into the chamber and an exit door out of the chamber. A control system causes the second door to lock when a weapon is detected inside the entrance chamber, preventing the person carrying the weapon from entering the bank. If a weapon is not detected, the second door is unlocked only when the first door of the entrance chamber has been closed and locked. This prevents a person inside the entrance chamber from holding the second door open while another person who may have a weapon enters the entrance chamber. The first door cannot be opened when the second door is open or a person is on a contact pad on the floor of the entrance chamber.

The walls of the Lagarrigue access system are made of concrete and thus a person cannot be observed passing through the vestibule.

the metal detector in the Lagarrigue patent is only for detecting Ferro-magnetic metals such as steel, and operates on measuring changes in a static magnetic field (also called Continuous wave technology), not changes in high frequency electromagnetic fields. The metal detector in Lagarrique also includes several magnetic field sources (such as ferrite magnets) arranged on each of the two side walls of the chamber and fills the area to be crossed by a person with magnetic fields. A series of large induction loops are adjoined to the magnetic field sources. An electronic device averages or adds the induction voltages being generated in the induction loops of the area crossed by the person. As a result, the reading obtained is practically independent of the location where the weapon is taken through the area.

One disadvantage of the Lagarrigue system is that the concrete walls must be poured at the assembly site, and must make use of molds to form the walls. Concrete construction is a very timely and costly construction method and banks do not want to create a construction site at their front door.

Another disadvantage of the Lagarrigue system is the use of double doors. Banks want a system with a single door as opposed to double doors used in the Lagarrigue patent. Double doors require twice the number of locks, making the system more expensive, and the double doors provide a space or gap between them in which an intruder can insert a foot to pry open the doors, making the system less secure.

Another disadvantage of the Lagarrigue system is that the metal is—from a security standpoint—designed to detect "Ferro-magnetic metals" only, which in today's world is impractical, considering the wide array of weapons made from exotic, non-Ferro-magnetic materials such as stainless steel zinc or aluminum and even plastics or ceramics.

Another disadvantage with the continuous wave based metal detectors of the Lagarrigue patent is that the detectors have high false alarm rates caused by poor electrical interference. The amount of electrical instrumentation used in today's environment is much more than at the time of the Lagarrigue invention. If the unit false alarms often, it will eventually be turned off or ignored by the security personnel, thus defeating its purpose.

Another disadvantage with the metal detector of the Lagarrigue invention is that, because the electronic device uses one series of loops to pick up the magnetic field generated by metals, the system cannot distinguish between a weapon and several pieces of metals carried by a person on several parts of the body, such as the keys, coins, metal watches, jewelry and other small items of metal carried by the person. Thus, the metal detector would indicate the presence of a weapon when no such weapon is present.

Another well known device of this type (U.S. Pat. No. 4,481,887 to Urbano) shows a security door and system of installation having bullet-proof walls and doors, the system being constructed in modular form for on-site assembly, the framework is made of steel or heavy aluminum, the vestibule (chamber) is rectangular or box shaped, the doors open automatically by photo cells, green and red lights indicating whether to wait or pass through the system, an automatic timing device is provided and operates after a person has entered the vestibule through the first door a predetermined time period to open the second door and allow the person to leave the vestibule and enter the building, overhead ventilators, the side walls and doors are made or transparent bullet-proof glass or plastic so that a person entering and leaving may be observed by bank personnel and an over-riding door-lock system with a manually operated switch can be used whereby when a bank robber is within the exit chamber all the doors are locked to trap the robber therein. The Urbano system also discloses that the over-riding door lock switch can be operated remotely by a hand-held remote control unit, and briefly suggests that a weapon detector may be integrated in the operating circuit to lock the doors. The Urbano patent does not provide any teaching as to how the weapon detector can be integrated with the system such as where the detector can be placed.

One disadvantage of the Urbano system is that the metal frame of the doors which open into the access chamber will interfere with a metal detector and produce false alarms, if the metal detector is located inside the chamber. The metal detector must be located inside the access chamber in order that only one person can enter through at a time.

Another disadvantage of the Urbano system is the use of automatically opening doors. Banks want a system with manually operated doors as opposed to automatically operated doors. Automatic doors are more costly to maintain and operate by the bank, since repairs would require an electrician and an electric motor needed to power the automatic doors would produce undesired magnetic fields that would reduce the sensitivity or accuracy of the metal detector.

Another disadvantage with the Urbano system is the use or double doors as discussed above with respect to the Lagarrigue system, whereby a space or gap is left between the doors that can be used to pry open the doors, and the doors require twice the number of locks.

Another disadvantage with the Urbano system is that the sides of the security chamber are formed of a single piece of bullet proof glass extending from the entrance end to the exit end of the chamber. This results in the requirement to use an extremely large piece of the bullet proof glass, which is extremely heavy and costly. When shipping and assembling the modular sections, the heavy piece of glass is harder to install than would two or more pieces. Also, if the glass was to break due to a fired bullet, the whole side section would require replacing instead of a smaller section.

Another disadvantage of the Urbano system is that the aluminum or steel frame must be of very heavy gauge material or be thick enough to stop a powerful bullet such as a 45 caliber. The heavier metal would cause the shipping costs to increase because of the added weight, and the manual assembly of the modular unit would be harder because one person would not be able to handle the heavy piece of metal frame.

Another well known device of this type (European Patent application 268 924-A to Maillot) shows an automatic access control airlock with a weapon detector having an eddy current movement detector, contact carpet presence detectors in the front and back of the passageway, locking and unlocking of the doors are controlled automatically by the presence detectors, the doors frames are made of a non-metallic material (fiberglass reinforced plastic), the first door opens toward the inside of the access chamber, the first and second door hinges are on the outside and are recessed, and the closing locking of both doors are set into the box frame. The non-metallic door frames is used for the purpose of reducing interference of the metal detector when the door opens toward the detector. The metal detector is located toward the first or entrance door.

One disadvantage of the European system is that the door frames are made of plastic. If the main frame is to be made of a metal such as aluminum, the cost and complexity of making the is greatly increased because of the need of different materials and processes of making them. Also, if a repair of the door frame is necessary—such as when a bullet hole in the door must be repaired—the entire door would have to be replaced, resulting in the entire unit being shut down until a replacement door can be delivered from the manufacturer. Also, the plastic used in the door would tend to dry out over time and crack. Further, screws are used to secure parts to the plastic door frame. The plastic around the screws tend to fracture over time, and thus, the screws tend to come lose.

Another disadvantage of the European patent application is that the contact carpet presence detectors have metal strips inside the pads which are exposed to air. The air can be humid, and when the water vapor condenses because of changes in, for example, the air conditioning, the metal strips can rust and thus create an electrical short.

Another well known device of this type (U.S. Pat. No. 4,741,275 to Lewinder et al.) shows a device for controlling access of the security chamber which can unlock all doors in case of a fire so as to free the passage to the exit from the bank. Also shown is a wireless remote control unit which is used to change the operating mode of the security chamber.

A device for manually controlling access to a security chamber such as that described in U.S. Pat. No. 4,741,275 to Lewinder et al. might prevent robbers from evading or "tricking" a completely electronically controlled system. However, the Lewinder device would be completely ineffective if the human operator was removed by force or did not detect the "trick."

Another well known device of this type (U.S. Pat. No. 5,311,166 to Frye) shows a security vestibule having a security access system which preferably operates on a low voltage independent power source, and a high voltage DC power source is used to power a switch. This patent is silent as to what parts of the system use the low voltage power source and the high voltage power source.

One disadvantage of the systems in the prior art devices is that the doors are made from a metal, and can cause the metal detector to give false readings. A door that opens toward the metal detector provides a metallic material within the range of the metal detector's magnetic fields.

Another disadvantage of the systems in the prior art devices (such as the Urbano device) that use a transparent material in the side wall is that the glass plate must be framed by the metal material used for the frame. This creates a closed electrical "loop" around the glass plate which can create magnetic fields that interfere with the metal detector.

Another disadvantage of the systems in the prior art devices is that none would satisfy the minimum requirements or the ADA and NFPA for nondiscrimination on the basis of disabilities by public accommodations and in commercial facilities because of dimensions, and thus could not be used in public or commercial buildings such as a bank or government office. For example, the inside width of the access unit must be a certain minimum width in order to accommodate a person in a wheel chair. A person in a wheel chair has to release the door and maneuver himself at the same time. 28 CFR part 36, 4.13.6 entitled "Maneuvering Clearance at Doors" requires that a minimum maneuvering clearances at doors that are not automatic or power-assisted shall be at least 12 inches from the inside frame of the door to the side wall of the passageway. That is, in order to use a manual door—which the banks most desire—which opens away from the person, the space between the inside frame of the door opposite from the door hinge and the side of the wall or the passageway must be at least 12 inches. Thus, if two chambers are used (one for an entrance and another for the exit), the overall width of the system is increased by 24 inches. This increase the bank floor space required for installation, and requires extra glass to build. The glass alone is very expensive, since it is three layers of glass and polycarbonate with an overall thickness of 1.5 inches. Further, shipping costs are increased because of the extra weight from the added materials. The embodiments of the prior art which use the circular access system do not have much space to accommodate a wheel chair, and their circular shape places the metal frame of the rotating door within close range of the metal detector, creating false alarms when the detector is set as sensitive levels.

another disadvantage of the prior art systems is that the magnetic locks are not very well protected against fired bullets, if a person with a weapon is trapped inside, or wants to pass through when the metal detector locks the door leading into the bank, the person can fire the weapon at the covering of the magnetic lock. If the lock is insufficiently protected, the lock could be opened by the fired bullet.

Accordingly, it is desirable to have an access control system that is more effective at preventing a would-be robber from entering completely through the access control chamber. The more effective method would be able to prevent the techniques described above for evading common access control chamber systems, would provide increased bullet-resistant protection to the metal frames and to the magnetic locks.

It is also desirable to make the access control chamber as small as can be to save space in the bank and save costs of materials, and to be large enough to meet with Access Control Unit Requirements for Financial Institutions in the United States for the disabled.

Accordingly, a principal object of the present invention is to provide a security access system for banks of the like which satisfies fire department regulations, handicapped regulations and to provide a more secure access control chamber.

BRIEF SUMMARY OF THE INVENTION

The instant invention overcomes the above disadvantages and shortages of the prior art by providing an access control chamber security system with substantial improvements such as:

providing for the chamber to be formed entirely of extruded anodized aluminum framing and bullet-resistant glass panels in the walls and doors, the chamber using a single metal detector in the center of the door system and spaced from the doors such that interference from the doors can be reduced or eliminated and that certain sections or the frame be made of multiple pieces to reduce deformation during extrusion and to increase the strength of the frame;

providing for an insulated cut section in the frame of the side walls and the frame of the doors in order than a closed electrical circuit near the metal detector will not be formed in the metal frame members near the detector;

providing a metal detector having a plurality of smaller coils spaced about to form zones of coils in order that each coil can be responsible for the detection of a weapon-like object at a specified position within the region that the metal detector extends;

providing for a three-second time delay between the time that a person first touches the second door until the magnetic lock on that door is re-locked in order to overcome the required extra 12 inches of width in the passageway leading to the door required by the codes;

providing for ballistic fiberglass panels inside the metal frame members and door frames to provide adequate bullet-resistance from high powered guns without increasing the thickness of the metal used in the frame, and two ballistic fiberglass panels in the ceiling;

providing the floor contact pads be filled with an insert gas such as nitrogen so that the metal plates therein do not rust out;

providing a seismic detector in communication with the access security chamber system in order to unlock all doors in the event of an earthquake or bomb explosion;

providing a bullet-resistant box covering over the magnetic locks in order that a fired bullet will not disable the lock;

provide for a 24 volt dc battery backup at the power supply box;

providing for continuous hinges on the doors and extending the length of the door in order to provide a stronger mount of the door and prevent removal by a person from within the chamber;

providing for the two side-by-side units to be capable of being split apart due to requirements of the building structure;

providing for the sides of the access control chamber to be formed of two sections with an aluminum framing member separating the two sections;

using metal door frames such that the interference therefrom does not interfere with the sensitivity of the metal detector which uses a plurality of induction coils, yet provide that the doors are made from the same material as the rest of the frame for the purpose of reducing the manufacturing costs and simplifying repair of damaged door frames;

providing a wireless remote control unit so that a second person can control the opening of the second door in the vent that the main operator must leave the area in which the main control panel is located;

providing the doors with a high-security closing mechanism which require a special tool to make adjustments to the closing mechanism such as the backstroke, the speed of closing, and the latch speed (speed of closing during the last 3 inches) so that a person with an ordinary tool such as a screw driver cannot tamper with the door, and the closing mechanism utilizing a rigid closing bar that has no elbow joint therein so that a person cannot pull down on the bar and bend it;

providing a 24 volt dc power source for the metal detector and the magnetic locks for the purpose of preventing electrical shock of a person within the chambers who may be installing or working on the system or from a tired bullet that may short out the electrical system;

providing for the metal detector to operate at 24 volts dc in order to prevent noise surges and peaks in the metal detector circuitry;

providing for the metal detector to remain on after the assembly has been shut down in order that humidity in the air will not accumulate on the electronics and cause the metal detector to produce false alarms;

providing photocells for detecting if a person is standing on the frame and off of the detection pads such that the system would not detect the presence of a second person in the chamber;

providing for a touch contact pad on the floor which has a plurality of induction coils for detecting the presence of a metal object such as a weapon placed on the floor; and providing a laser or infrared sensor to detect if a weapon has been left on the floor pads;

The objects of the invention are realized in that the access control system utilizes an aluminum skeleton frame made of extruded anodized aluminum, door frames made of the same aluminum material to reduce the material list, the doors in the chamber of the metal detector swing outward to reduce interference therefrom, ballistic fiberglass panels inserted into hollow sections of the frame members in the skeleton frame and the frame of the doors, ballistic fiberglass panels in the ceiling, transparent bullet-resistant glass panels in the doors and walls, a metal detector located in the middle of the access control chamber and having a plurality of induction coils arranged along zones of the access control chamber, a 24 volt DC uninterrupted power supply (UPS) which can be plugged into a typical AC outlet and which uses common 24 volt DC batteries for the UPS source, the system and the metal detector operating under 24 volt DC so that the system can be installed in any part of the world with minimal modification and so that the possibility of electrocution during installation, or if a tired bullet was to short out the system, the frame members along the side walls having a cut section in the lower frame member and an insulated member inserted in the cut to produce an open electrical loop within the frame of the side walls, a three second time delay from when the exit door is opened until the controls initiates locking of the lock on the door so that a person in a wheel chair has time to maneuver his wheel chair while attempting to pass through the door, using floor contact pads filled with an inert gas such as nitrogen so that the metal plates seated within do not rust over time due to water vapor in the air using a seismic detector in communication with the access security system so that the doors are unlocked in the event of an earthquake or bomb explosion, using a plurality of metal plates covering vulnerable sides of the magnetic locks to provide a bullet-resistant covering for the locks, using a wireless remote control box so that a second operator can control the opening of the exit door, keeping power supplied to the metal detector on at all times even after the rest of the system has been shut off after closing of the doors so that water vapor does not condense on the electrical circuits and produce shorts and false alarms, using photocells to project a beam of light along lower frame members to detect if a person is attempting to tool the system by straddling the floor pads, and using a laser or infrared sensor to project a beam along the floor to detect if a weapon or other object was left on the floor.

The use of induction coils in the metal detector works by producing eddy currents in a metal object which is moving through the magnetic field. Since the only moving metal parts of the access control vestibule is the doors frames, and the doors frames are located at the end of the vestibule, placing the metal detector midway between the doors provides the least amount of interference from the doors, also, the length of the vestibule is such that the doors are far enough away so that eddy currents are not substantially produced by the moving doors. The doors also swing towards the outside of the vestibule for maximum allowable spacing from the detector.

Other objects, features and advantages of the present invention will become apparent from a consideration of the following detailed description, and from the accompanying drawings.

BRIEF DESCRIPTION OF THE DRAWINGS

FIG. 6b is a schematic diagram of the ACU taken along line A—A of FIG. 6a.

FIG. 11 shows an inside view of the electrical panel with two 24 volt DC batteries located therein.

FIG. 12*a* shows one of the doors with a continuous hinge along the length of the door securing the door to the frame.

FIG. 12*b* shows the continuous hinge used for the doors.

DETAILED DESCRIPTION OF THE PREFERRED EMBODIMENTS

Figure 1:
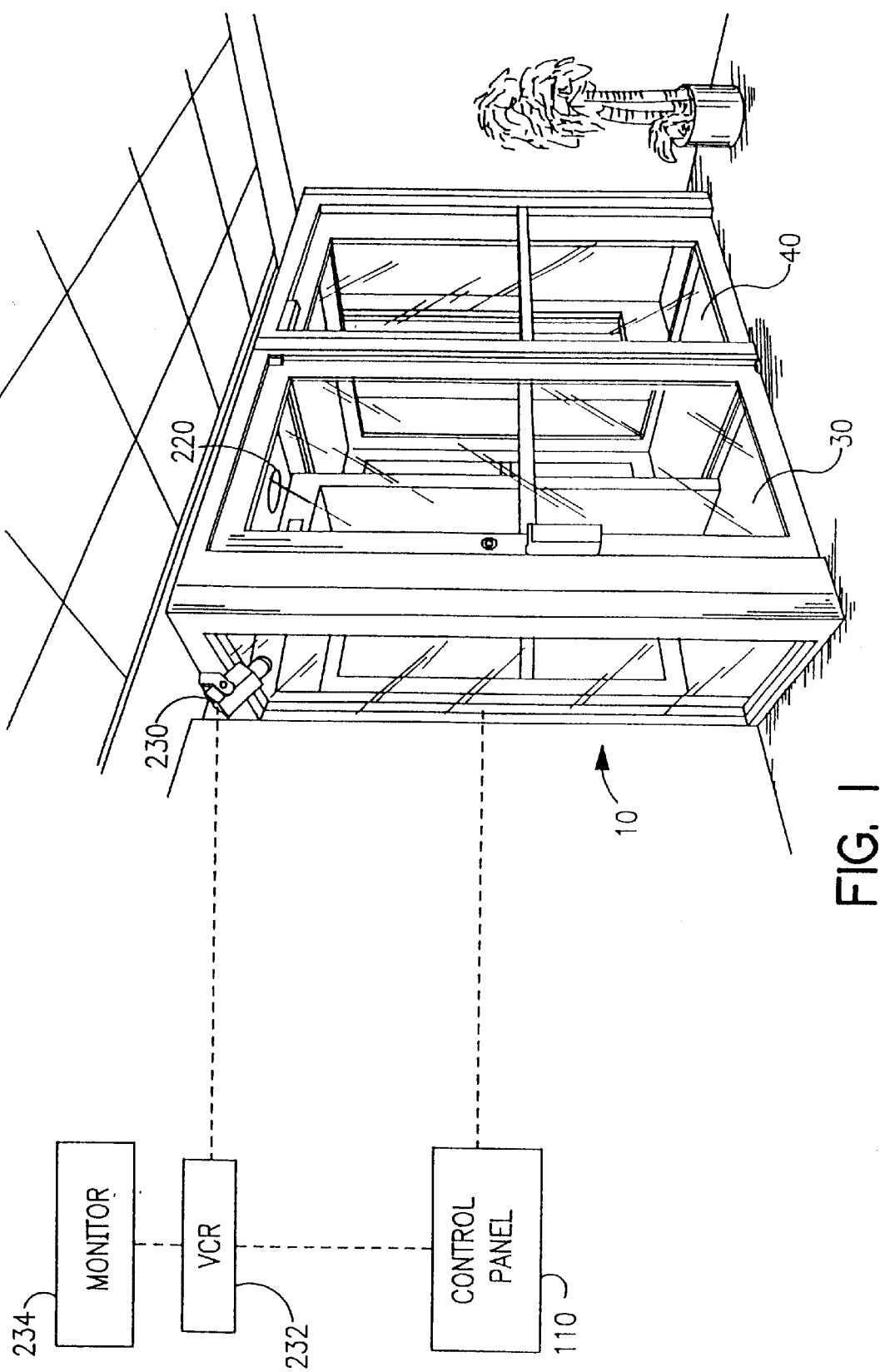
FIG. 1 is a perspective view of an illustrative preferred embodiment of the invention from an interior angle.

The preferred embodiment of the present invention, an access control vestibule preferably includes an access control unit (ACU) 10 having an entrance chamber 12 which includes a metal detector 60 and an exit chamber 14, a control panel 110, and a power supply 160. The ACSS also preferably includes switching arrangements 180 for remote personnel, such as bank tellers, to provide a control signal to prevent exit from the exit chamber 14.

Referring more particularly to the drawings, FIG. 1 is a depiction of a perspective view of a preferred embodiment of the ACU 10 as viewed from the interior 16 of the protected area.

Figure 2:
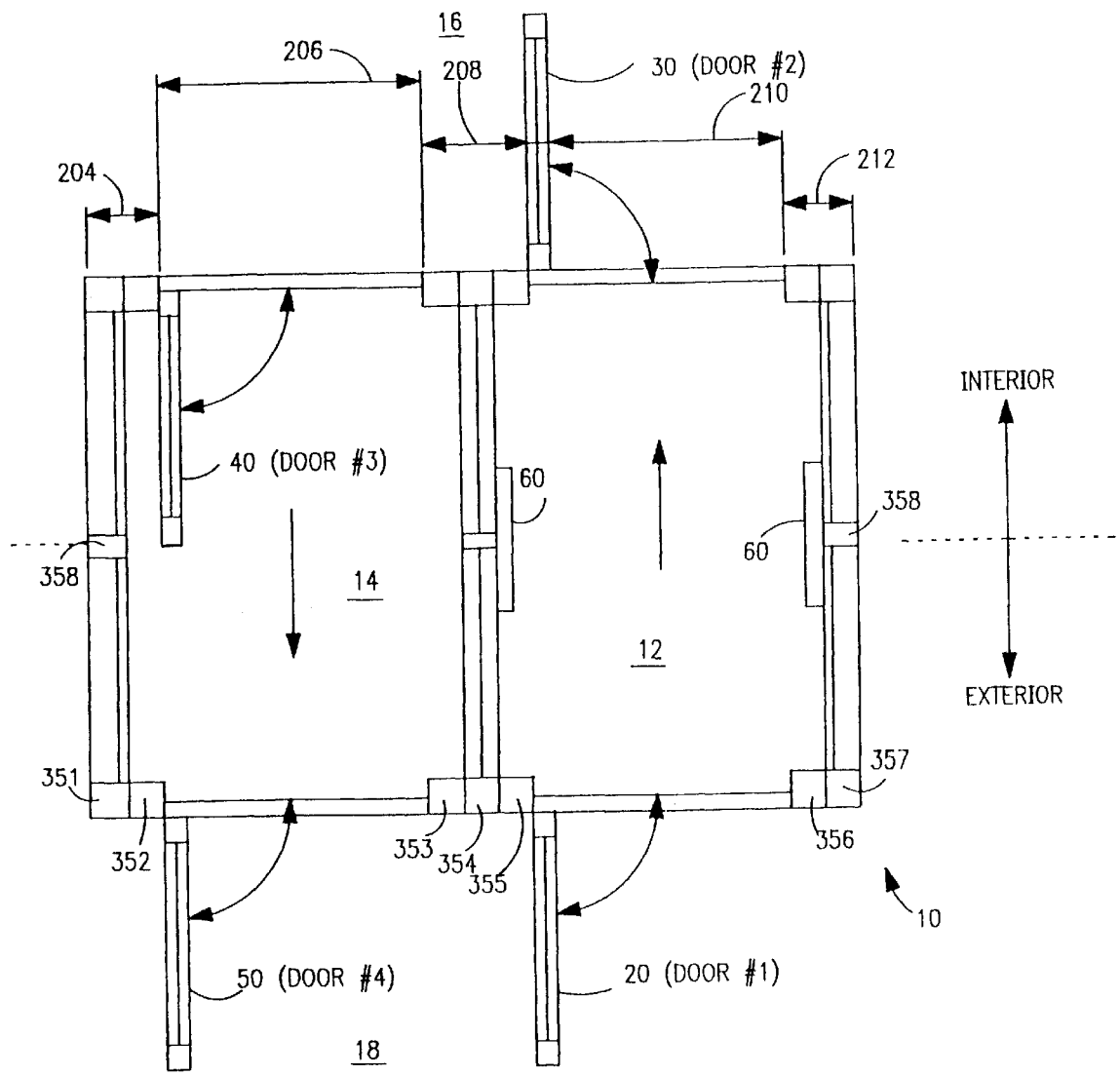
FIG. 2 is an overhead schematic diagram of the preferred embodiment of the access control vestibule (ACV) including an entrance chamber and an exit chamber.

FIG. 2 shows an overhead schematic diagram of the ACU 10. The ACU 10 includes an entrance passage or chamber 12 which allows controlled departure from the exterior 18 of a structure such as a bank to the interior 16 of the structure. The entrance chamber 12 preferably includes double interlocking doors 20 and 30 and a metal detector 60. The ACU 10 also includes an exit passage or chamber 14 which allows controlled access from the interior 16 to the exterior 18 of a structure. The exit chamber 14 preferably includes double interlocking doors 40 and 50. The skeleton frame includes frame members 351–358.

Figure 15:
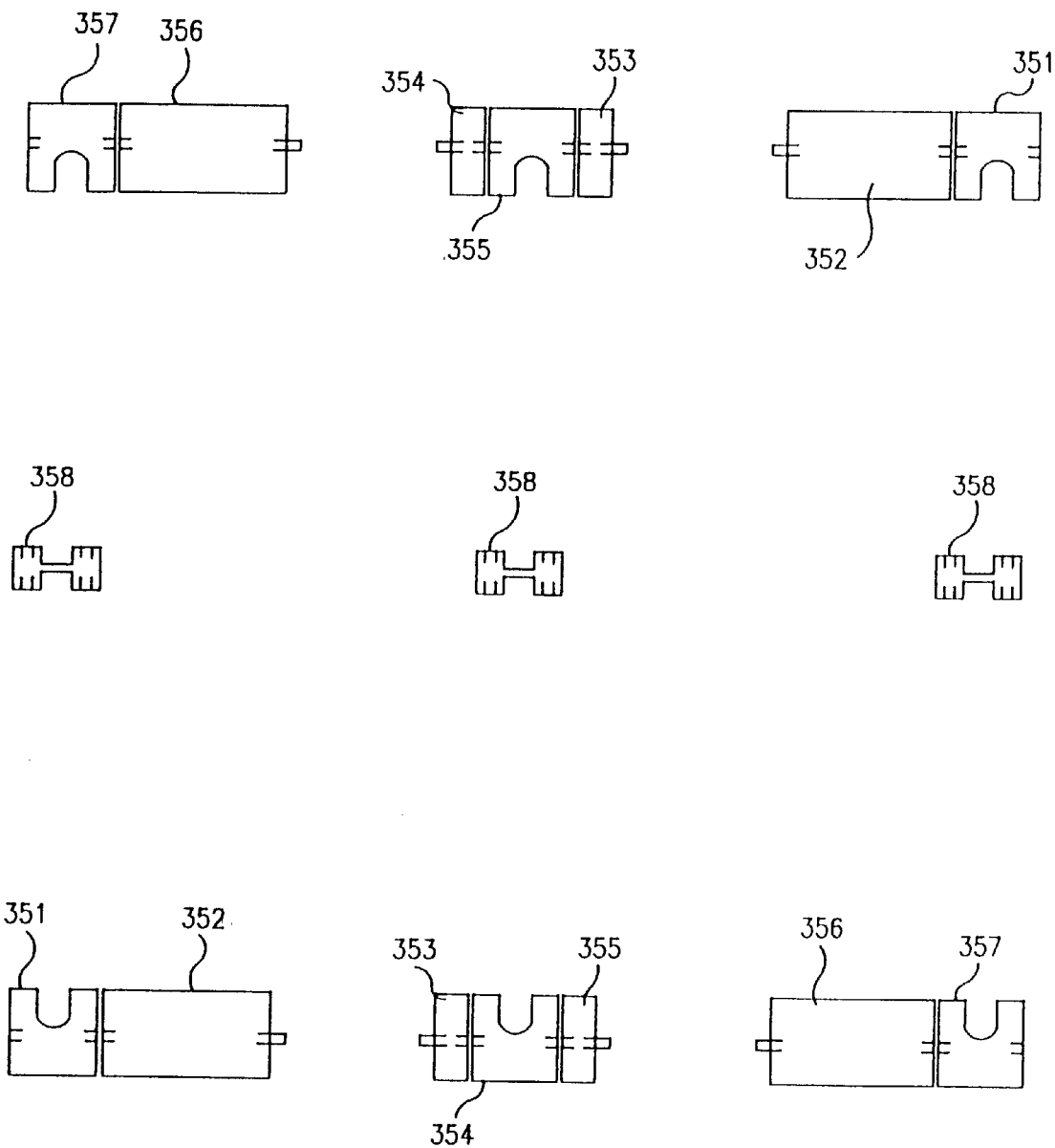
FIG. 15 shows cross sections of the vertical arranged frame members.

FIG. 15 shows a cross section of the vertical frame members and their arrangement. The exit side is shown with frame members 351–357, while three identical frame members 358 are used in the center. The entrance side would be a duplication of the frame members 351–357 used on the exit side. The frame members are preferable extruded of anodized aluminum. The frame members could be made of steel, but steel can be scratched, and the scratches can rust, producing an undesirable appearance. Anodized aluminum will scratch, but will not rust and thus the scratches are not as noticeable. Banks prefer the use of anodized aluminum because of its good appearance. Post sections 351–352 and 353–355 are made of two and three pieces, respectively, instead of one with the same size as the plurality of pieces. Present technology in the extrusion process would produce deformation in a large piece the size of both frame members 351–352 together. The deformation would result in a detective frame member. By using several smaller pieces, the deformation is eliminated. Also, one the side where one member (for example 353) is joined with another member (for example 354), the overall thickness would be twice the thickness of the individual frame members. This double thickness increases the overall strength of the frame. Thus, using multiple pieces such as frame members 353–355 at the center would provide a stronger frame than would a single piece having the same overall size.

The front and rear sides of the frame are the same. The rear side (or exit side) of the frame includes a left side outer corner post 351, a left side inner corner post 352 adjacent to the left side outer corner post 351, a center post 354, a side center post 353 and 355 adjacent to each side of the center post 354, a right side outer corner post 357, and a right side inner corner post 356 adjacent to the right side outer corner post 357. As discussed above, the reason for using three posts 353–355 in the center instead of a single post having the same size is that the extrusion process would produce deformations in a single large piece. By using three pieces, deformations in the extrusions are not a problem. Also, if each post member had a thickness of, for example, ¼ inch, then the thickness of the post assembly where two posts are adjacent would be ¾ or ½ inches. A single piece extrusion could not be formed having an interior wall twice as thick as the outer wall without significant deformation.

Incidentally, in the following specification the outer entry door is referred to both as the No. 1 door, and by reference numeral 20, the inner door is referred to both as to the No. 2 door and as door 30, and the two exit doors are referenced both as the No. 3 and No. 4 doors and by reference numerals 40 and 50 respectively.

Figure 3:
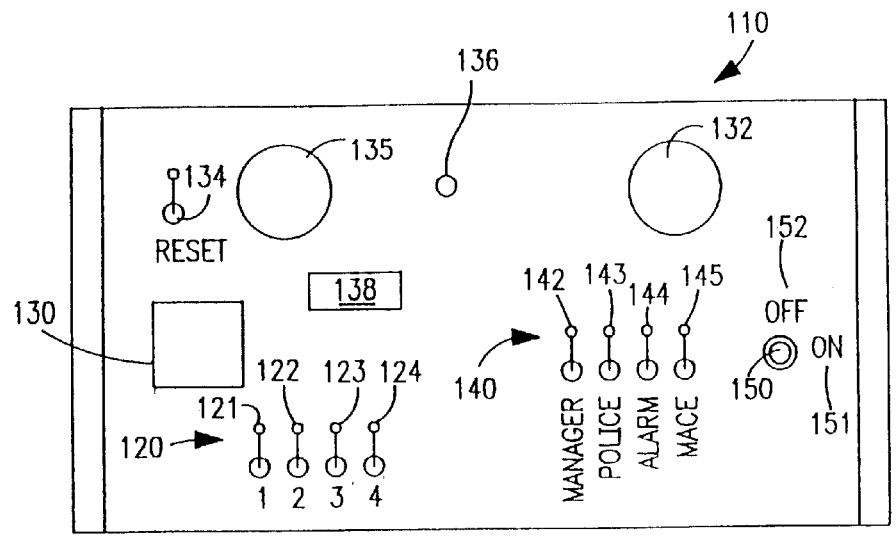
FIG. 3 is a front view of a control panel which may be employed in the access control system.

The ACSS would preferably include a control panel 110 which would provide multiple alarm features from a location remote from, but preferably in view of, the ACU 10. FIG. 3 shows a preferred embodiment of a control panel. The control panel 110 preferably has four door toggle switches 120 which may be marked "1, 2, 3," and "4" to control the doors of the chambers 20, 30, 40, and 50 respectively.

Figure 19:
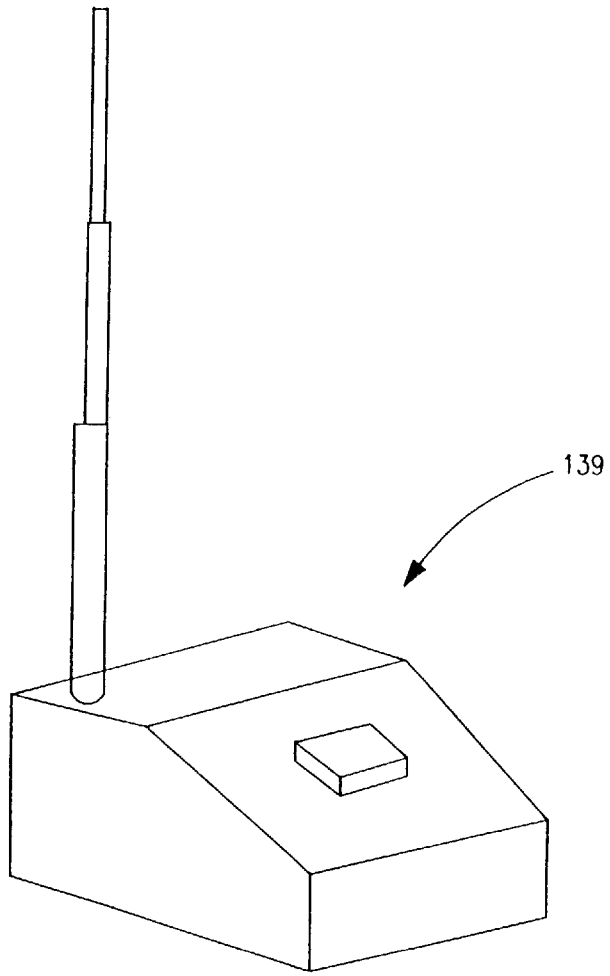
FIG. 19 shows a wireless remote control button for opening the exit door of the entrance side of the vestibule.

The normal operational position of the door toggle switches 120 is preferably "down," indicating automatic actuation. One or more of the doors may be locked by toggling the desired door switch "up." Please note that these positions could be reverse without changing the intent of the invention. The control panel 110 may also a door No. 2 release button 130 to release door No. 2 if the metal detector 60 is activated. The door No. 2 release button 130 would allow an operator to enter the entrance chamber 12 to inspect and/or remove the object which triggered the metal detector 60, or to permit the entry of a known wheel chair customer or a known armed policeman. Alternately or in addition to the door No. 2 release button 130, a wireless transmitter and receiver door No. 2 release button 139 shown in FIG. 19 may be included in the ACCSS to allow a second operator to release door No. 2 from any position in the secured facilities. In the event that the main operator needs to leave his position near the main control box, such as for going to the bathroom or into the vault, the main operator can leave the wireless remote control box with a second person or operator. The second operator can then control the opening of the door from there own desk without having the travel to the main control panel.

The control panel 110 may also include an emergency button 132 that will release all doors (20, 30, 40 and 50) in the event of fire or any other emergency. The emergency button 132 may also be used to de-activate the ACCSS at the end of the day when everybody is leaving the building and the doors are going to be locked with a key. In the preferred embodiment, the metal detector 60 remains on at all times after the system has been shut down for the night or after closing of the bank. Since the air in the bank or building contains water vapor, water can form on the electronics of the metal detector when the air conditioning in the building has been shut off or lowered due to closing. The water can short out the metal detector. I have found that leaving the metal detector on after the rest of the system has been shut off prevents the water from forming on the electronic circuit of the metal detector and eliminates the false alarms resulting from the electrical shorts.

The control panel 110 may also include means 140 for controlling specific alarm features. The alarm features may be controlled by an alternate action key switch 150 and toggle switches (142,143,144 and 145) may be set to operate only when the key switch 150 is in the "on" position 151 and not when it is in the "off" position 152. Preferably the toggle switches (142,143, 144 and 145) will only operate in a predetermined sequence (i.e., manager switch 142 enables police switch 144, etc.). These switches, however, could operate separately without changing the scope of the invention.

A switch 142 may be provided to activate an alarm to advise the manager of the institution if there is any problem. Another switch 143 may be provided to activate the panic alarm system of the institution that alerts the police department. Another switch 144 may be provided to activate an alarm inside the entrance chamber in case of someone brandishing a weapon. One or more additional features such as a switch for activating a camera or for providing means of subduing the person in the chamber such as by spraying the person with MACE, by the activation of a high pitched, high intensity siren, or by other known means.

It should be noted that the features described on the control panel 110 are meant to be exemplary and are not meant to limit the scope of the invention. For example, a reset button 134 may be provided to reset the ACCSS. A metal detector alert means 135 such as speaker for a pulsating audible is sound or flashing LED may also be included. Another optional feature might be an ADA alert LED 136 may be provided to alert the operator that a disabled person needs assistance. There may also be intercom 138 with a microphone speaker, and controls which allows the operator to communicate with persons in the chambers 12 and 14. Further, the control panel may be constructed so as to utilize technology such as digital control buttons, analog switches and dials, mechanical means or any known technology. For example, the toggle switches 140 may be replaced by capacitance actuated switches, by a key pad with numbered buttons, or a dial with specific positions.

Figure 4A:
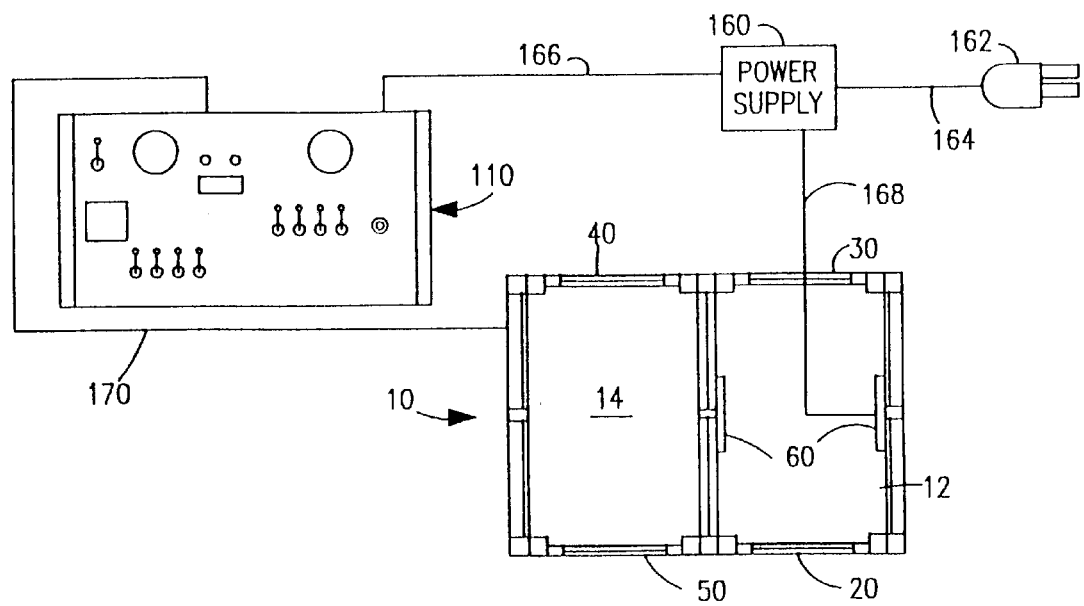
FIG. 4a is a schematic diagram of the connections between the teller's switches and the exit portal of the system.
Figure 4B:
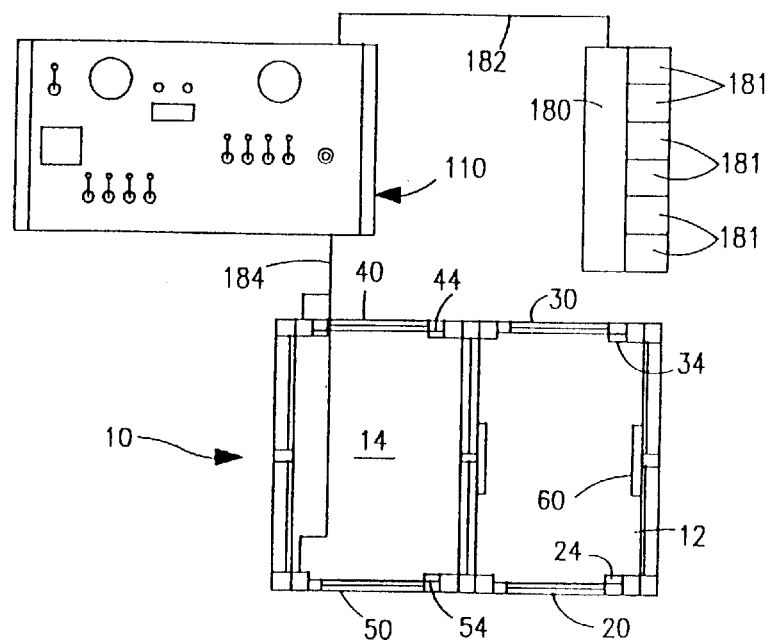
FIG. 4b is a schematic diagram of the connections between the teller's switches and the exit portal of the system.

The control panel may be connected to the ACCSS as shown in FIG. 4A (power connections). FIG. 4B (connections between the teller's switches and the exit portal), and FIG. 4C (connections to the metal detector). The connection may be accomplished by means of "hard-wiring" or wireless means such as radio waves, infrared ray ultrasonic waves or other means of wireless connection.

FIG. 4A shows a preferred power connection of the present invention. Power supply 160 is preferably a 24VDC which may be connected by means 164 to a 110 VAC wall outlet power supply 102. The power supply may also be an independent power supply such as a battery or generator or may have similar means of back-up power supply in the event that power from the wall outlet 162 fails or is prevented. Using a 24 volt DC power source instead of high voltages like 110 AC or 220 AC (vac) would be safer, since a person is not likely to be electrocuted from 24 volts such as when installing the system or if a fired bullet was to short the system out. Using 12 volts DC (vdc) would require more power and more current than would 24 vdc, and also would require larger wires to carry the larger current. Installing a system with 100 vac would also require a licensed electrician, and that would increase the cost of installing the system. A licensed electrician would not be needed with the smaller voltages of the present invention. Also, a battery backup for 24 vdc power supply would need only to use low-priced 24 volt batteries. A high voltage source like 110 vac would require an expensive uninterrupted power supply (UPS). Using an alternating current like 110 vac would also cause false alarms in the metal detector because of the electrical noise, surges and peaks. The power supply 160 is connected to the control panel 110 by wiring 166 to supply 24 VDC to the control panel 110. The power supply 160 is also connected to the metal detector 60 by means 168 to supply 24 VDC to the metal detector 60. 24 VDC is preferably supplied from the control panel 110 by wiring 170 to the ACU 10 to control such features as the Magnetic Locks (24 and 34 in FIG. 5A and 44 and 54 in FIG. 5B), push bars 25 and 55 in FIG. 6C and 35 and 45 in FIG. 6D), and other devices needing power (such as buttons, sensors, and alarms). These power connections are meant to be exemplary and are not meant to limit the scope of the invention.

FIG. 4a also shows a seismic detector electrically connected to the control panel. In the event of an earthquake, the doors should be unlocked so that people within the system can escape. The seismic detector will supply a signal to the controls indicating that a quake is occurring. The controls will then produce an electrical signal unlocking all of the magnetic locks. The seismic detector would also sense for a bomb explosion and produce a signal for the controls that will also result in the locks being de-activated or unlocked.

Figure 8A:
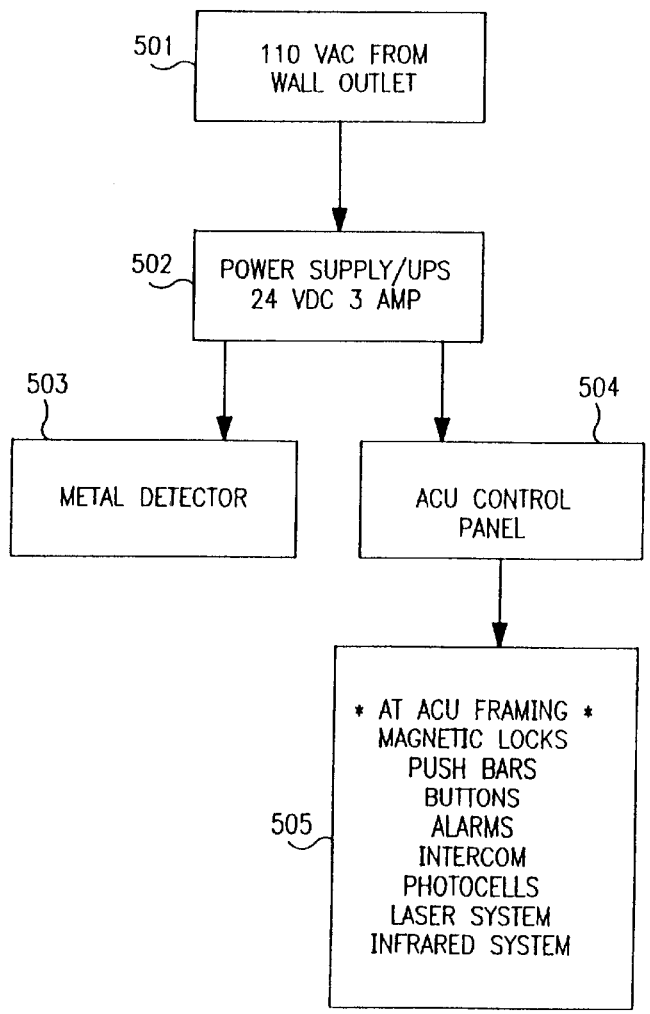
FIG. 8a is a block diagram of the power requirements of the present access control system.

FIG. 8A is a block diagram of one embodiment of the power requirements and system shown in FIG. 4A. 110 VAC from a wall outlet as indicated by block 501 is input into a power supply 502. The power supply 502 supplies power to the metal detector 503 and the ACU control panel 504. The ACU control panel 504 in turn supplies power to the magnetic locks, push bars, buttons, alarms, intercom system (speakers 220 shown in FIG. 1), photocells, laser system, infrared system, and other elements of the ACU requiring power as indicated by block 505.

FIG. 4B indicates schematically the connections which allow employees, such as tellers, at fixed locations, such as the teller counter 180, to remotely prevent exit from the exit chamber 14. This feature would allow a teller to prevent the escape of a robber. The teller counter 186 would have multiple switches or buttons 181 which the teller could use in the event of a robbery. The switches 181 are preferably connected to the control panel 110 by wiring 182. The control panel 110 then sends a signal via circuit 184 to the ACU 10 prevent the No. 4 door 50 from opening by maintaining energization of the magnetic lock 54, as well as the magnetic lock 44 on the No. 3 door 40. These connections are meant to be exemplary and are not meant to limit the scope of the invention. For example, the teller switches 181 could be connected directly to the No. 4 door 50.

Figure 8H:
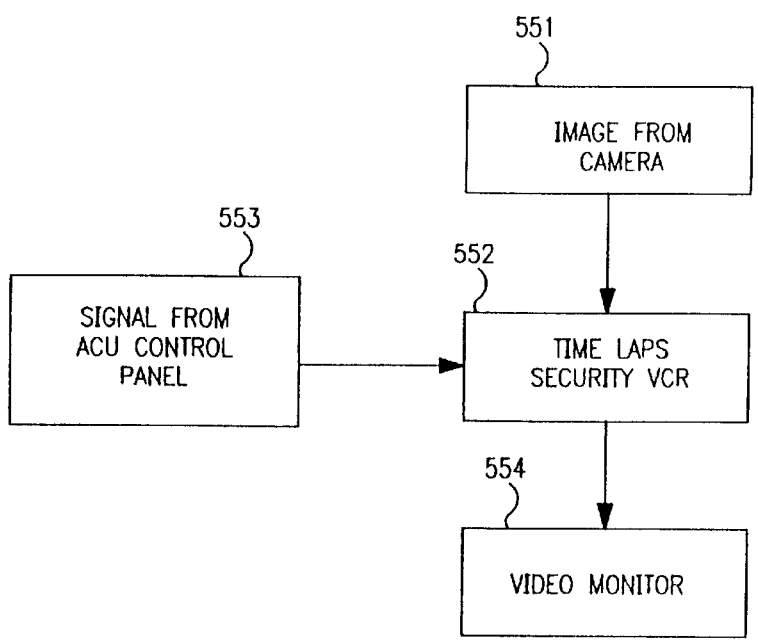
FIG. 8h is a block diagram of the entrance chamber camera system interface of the system.
Figure 8B:
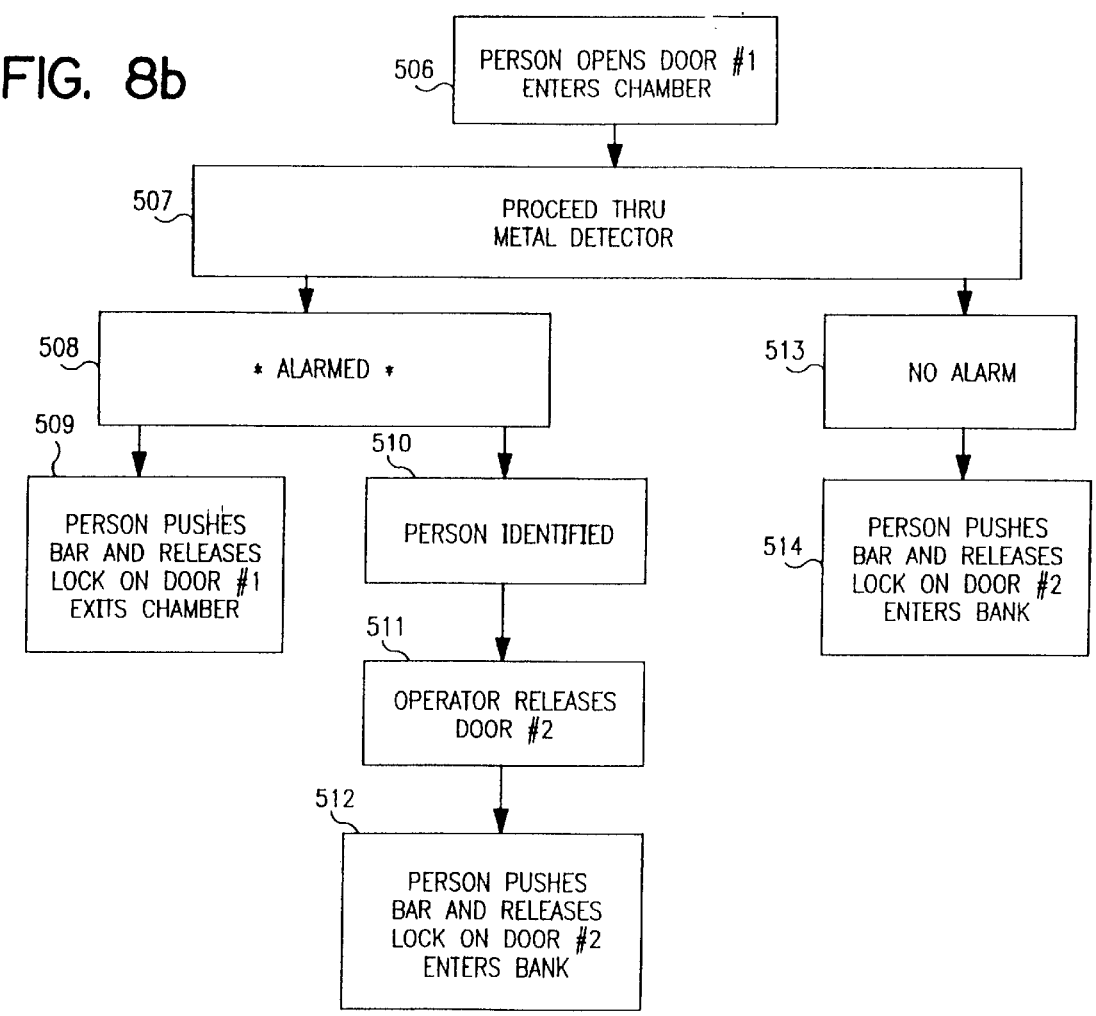
FIG. 8b is a block diagram of the entrance chamber metal detector interface of the present system.
Figure 8D:
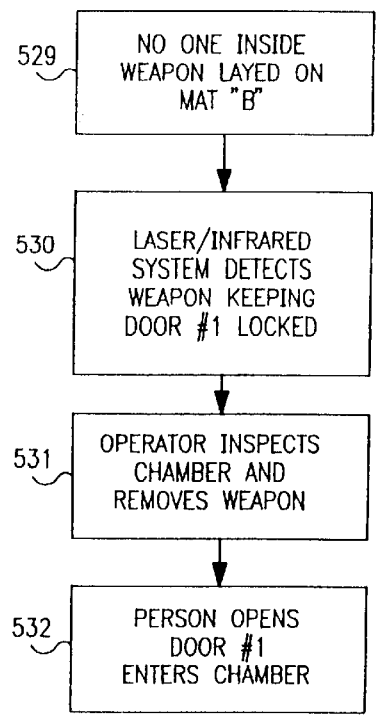
FIGS. 8c–8d are block diagrams of the entrance chamber interlocking doors system of the present ACV invention.
Figure 8C:
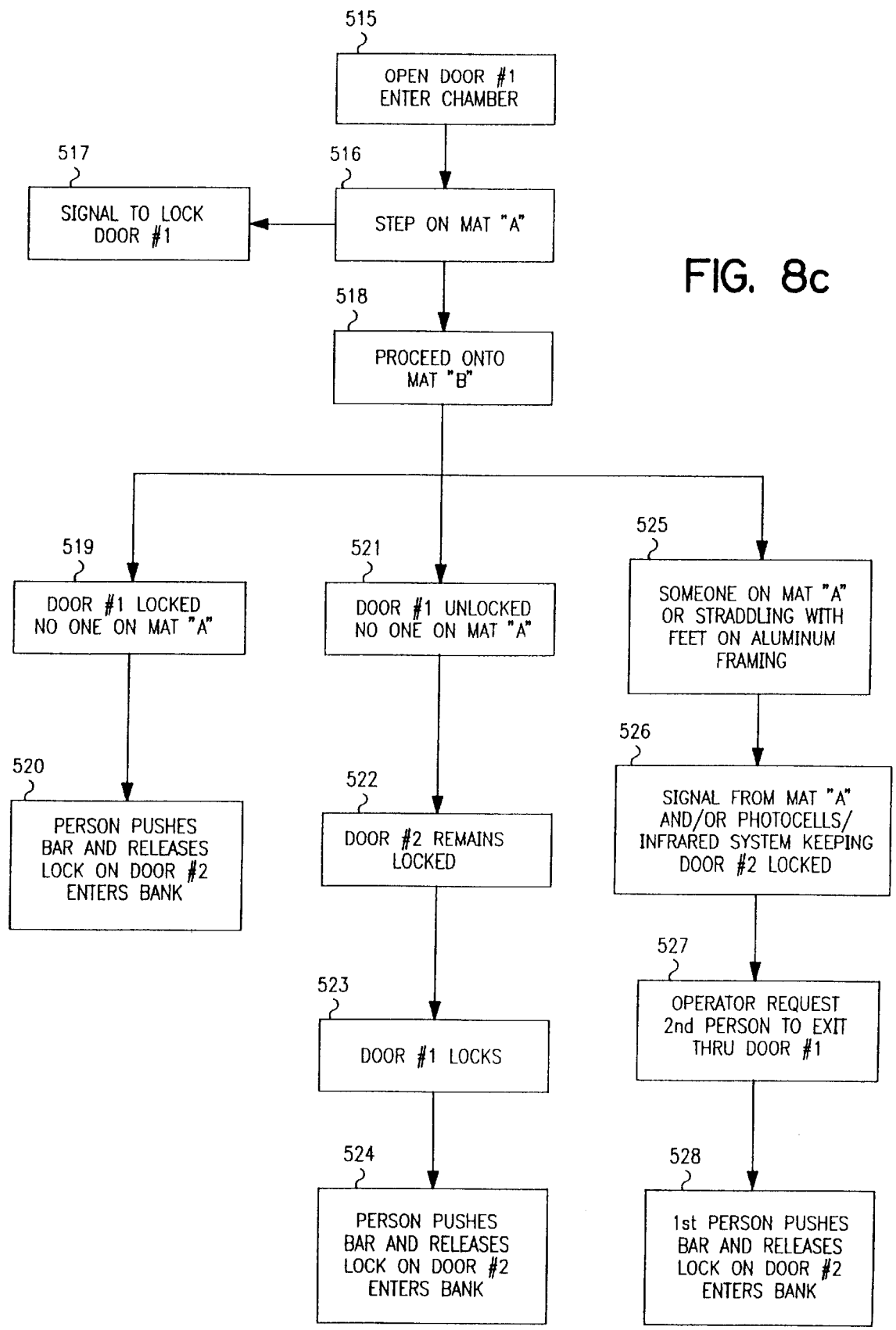
Figure 8E:
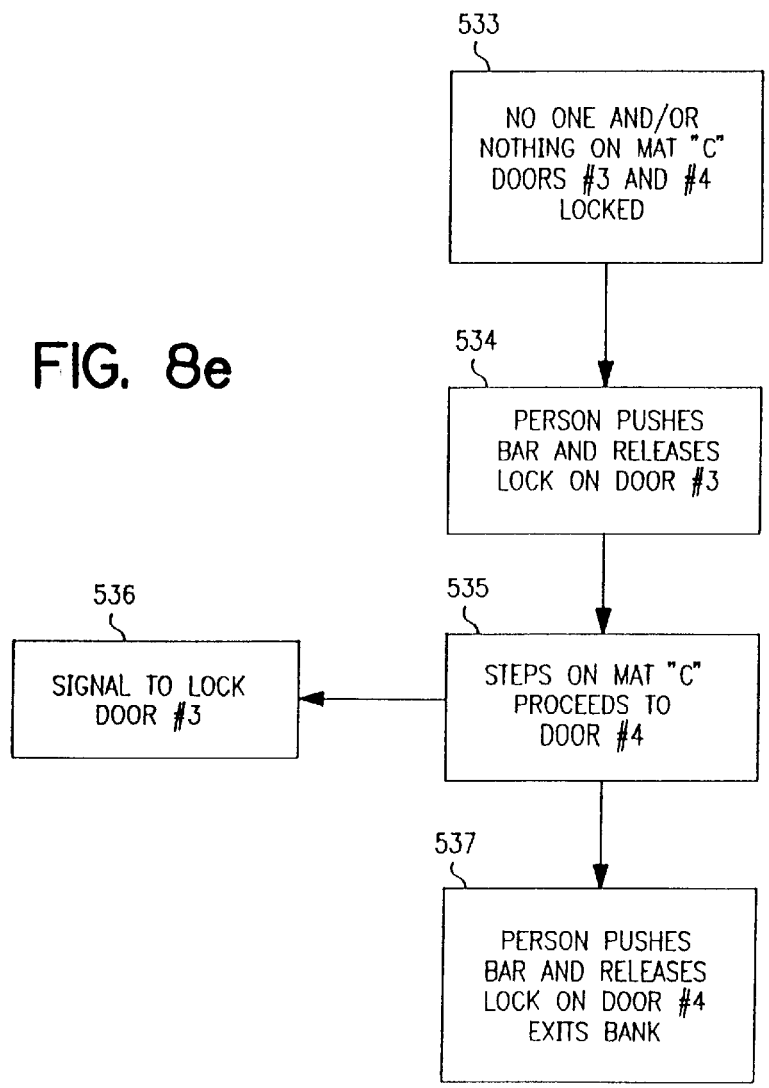
FIGS. 8e–8f are block diagrams of the exit chamber interlocking doors system of the ACV.
Figure 8J:
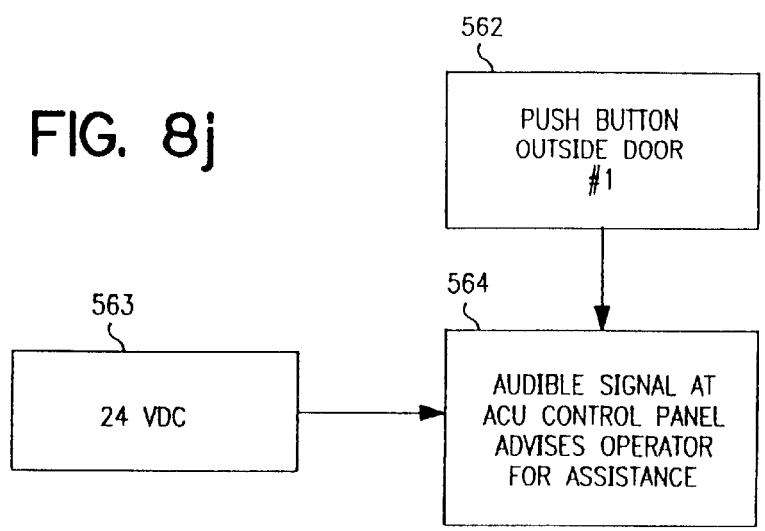
FIG. 8*j* is a block diagram of the operation of the ADA assistance push button arrangements of the access control system.
Figure 8F:
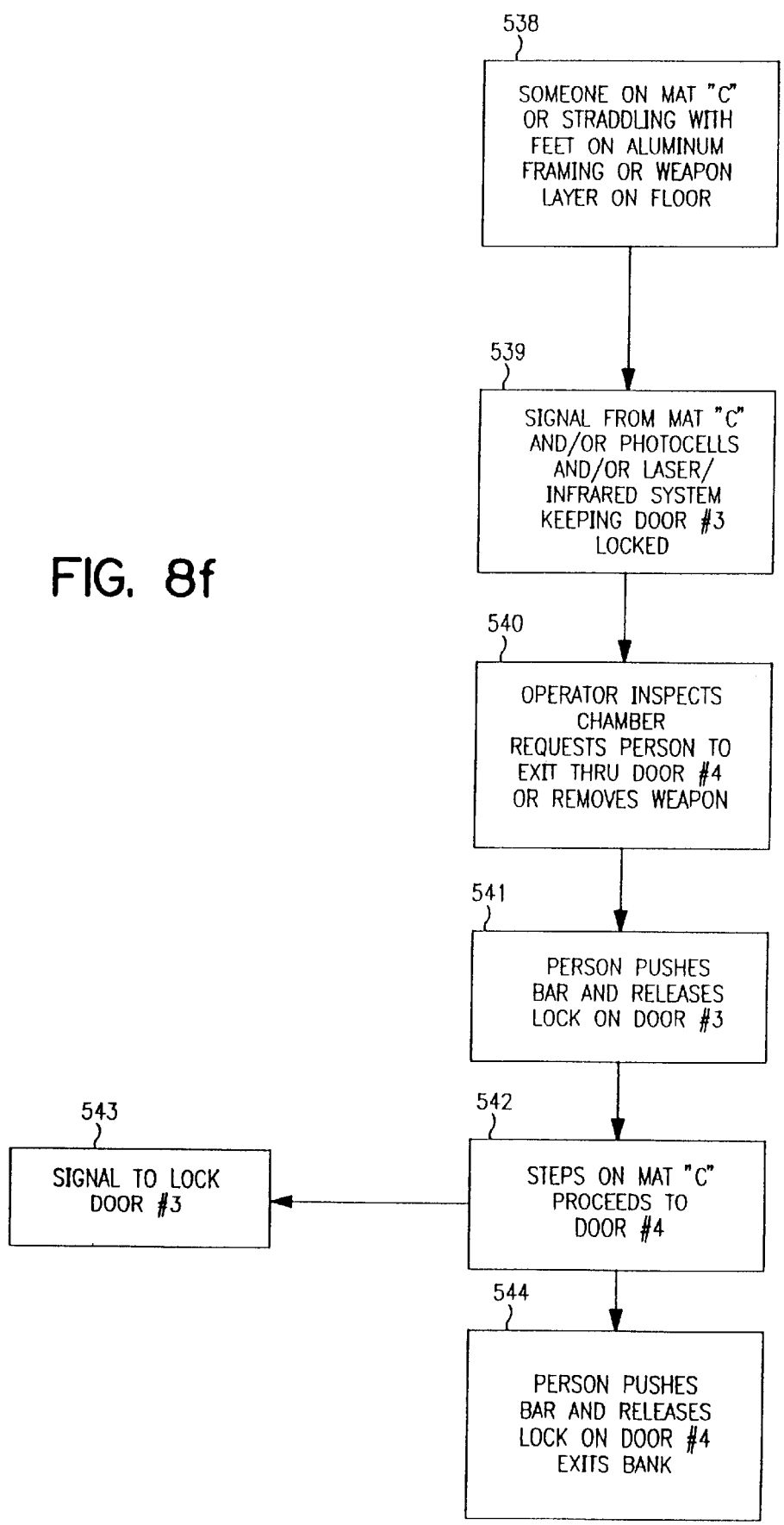
Figure 8G:
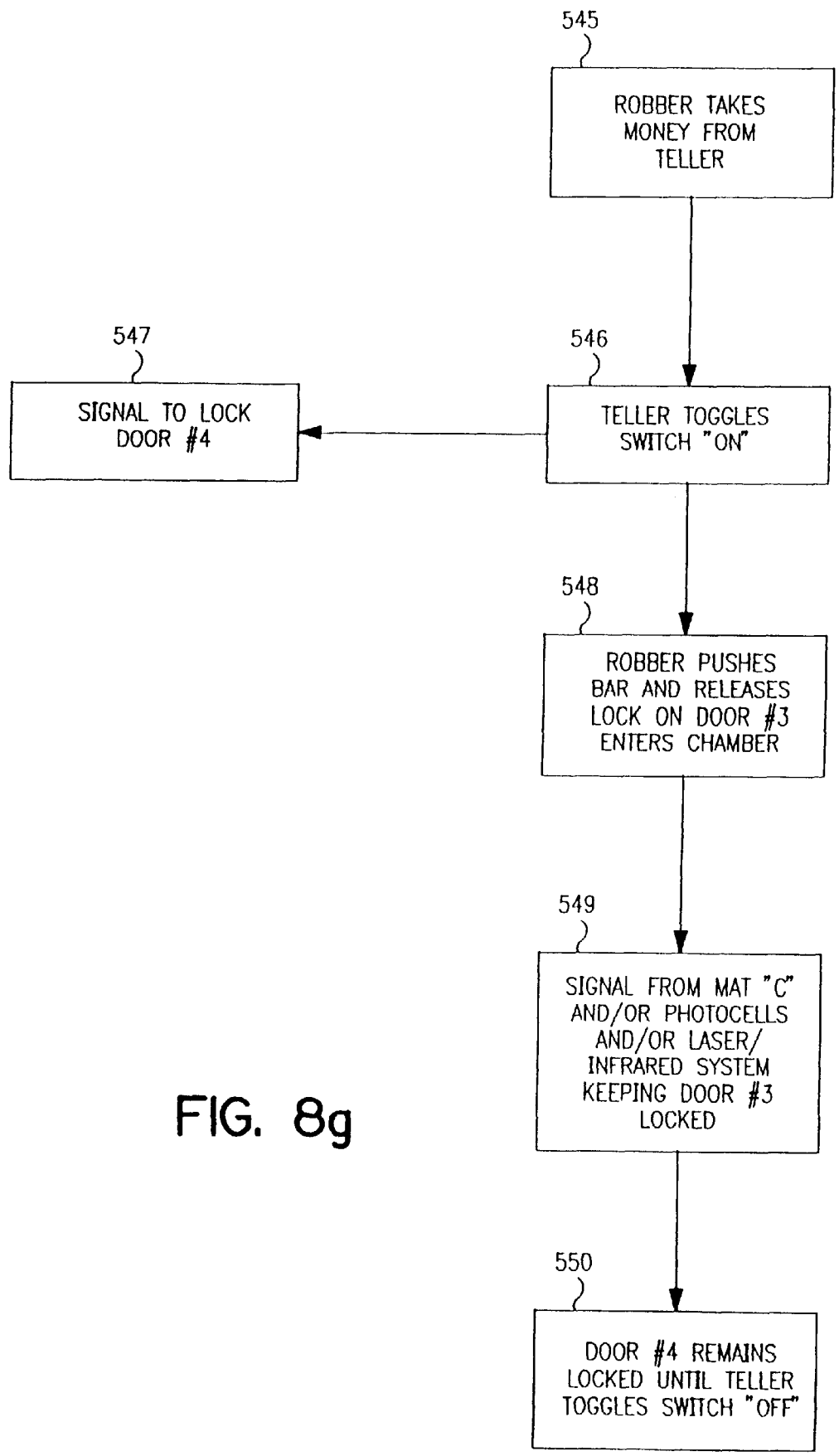
FIG. 8g is a block diagram of the operation of the tellers' toggle switches to close the exit chamber of the access control system.

FIG. 8G is a block diagram indicating the operation of the teller's toggle switches to lock the exit chamber. When a robber takes money from a teller as indicated by block 545, the teller toggles a switch "on" as indicated by block 546. A signal is then sent directly or indirectly to lock door No. 4 as indicated by block 547. The robber pushes the push bar on door No. 3 and releases the lock on door No. 3 and enters the exit chamber 14, as indicated by block 548. When the robber steps on mat C, activates the photocells, and/or triggers the laser or infrared system, a signal is sent from the triggering device which keeps door No. 3 locked as indicated at block 549. The robber is unable to leave the exit chamber 14 because door No. 4 remains locked until the teller toggles the activated switch "off" per block 550. The robber is thus held in exit chamber 14 until the police arrive.

Figure 4C:
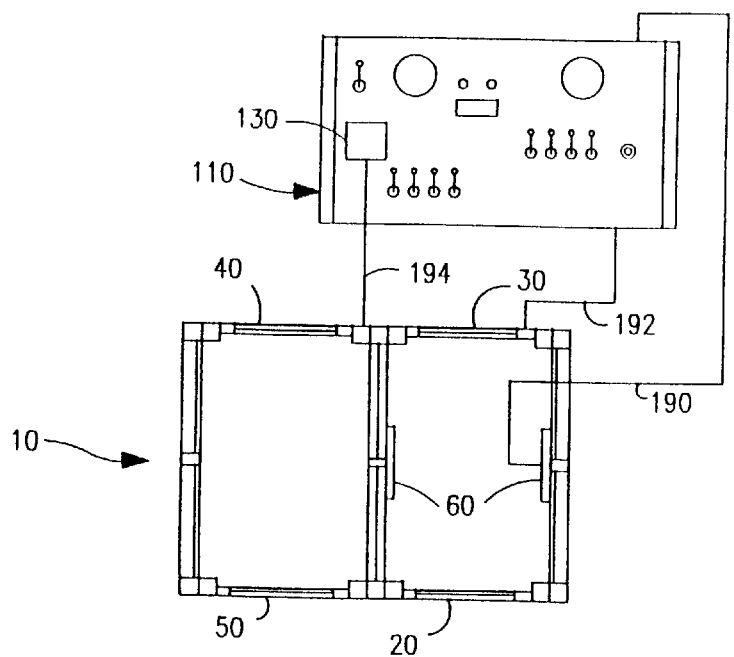
FIG. 4c is a schematic diagram of the connections involving the metal detector in the illustrated access control system.

FIG. 4C shows the ACCSS contacts for the metal detector 60. More specifically, the metal detector 60 sends a signal (when activated) by the circuit 190 to the control panel 110. The control panel 110 circuitry then operates through circuit 192 to hold No. 2 door 30 locked. An operator may release No. 2 door 30 by pushing a release button 130 whereby the control panel 110 sends a signal through circuit 194 to release No. 2 door 30. These connections are meant to be exemplary and are not meant to limit the scope of the invention. For example, the metal detector 60 could be directly connected to No. 2 door 30. Also, as indicated above, there may be alternate methods of releasing No. 2 door 30. Normally, of course, when the entering person steps from the first mat go onto the second mat 92, without activating the metal detector 60, the second inference door 30 is unlocked; but this action is blocked by a positive response form the metal detector 60.

As described above, the ACU 10 is designed to control or meter access into and egress out of a secure facility using an entrance chamber 112 having dual interlocking entrance doors (20 and 30) and an exit chamber 14 having dual interlocking exit doors (40 and 50).

Figure 5A:
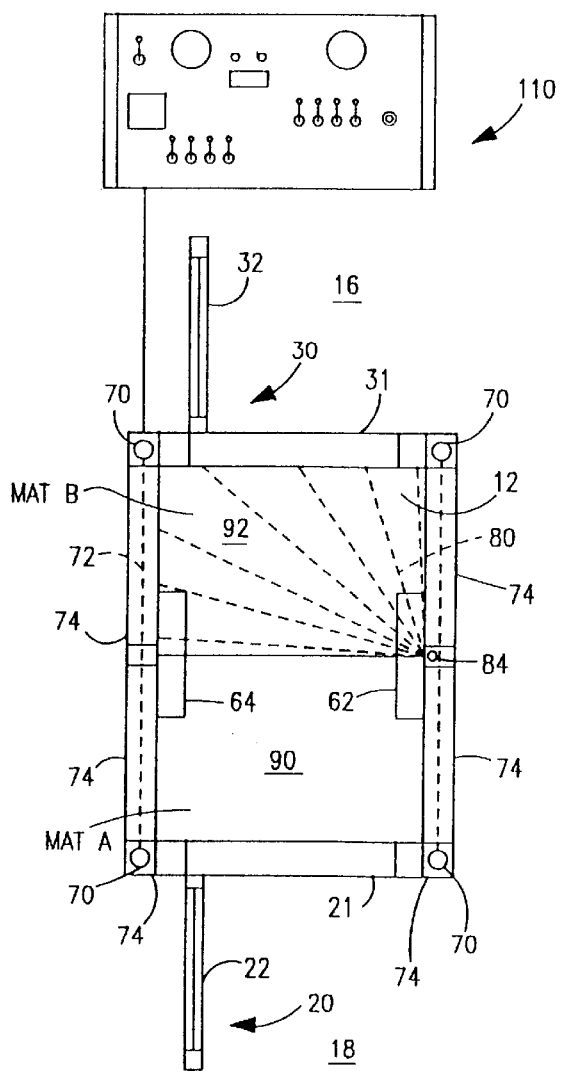
FIG. 5a is a schematic diagram of the entrance chamber interlocking doors system.

FIG. 5A shows the entrance chamber 12 which controls access using a dual interlocking entrance door system (20 and 30). The doors 20 and 30 are located on either end of the chamber 12 and preferably have electromagnetic locks (24 and 34) and touch sense bars (25 and 35, FIGS. 6C–6D). The exterior No. 1 do 20 is normally in the closed position 21, but may be brought to an opened position 22 by manually pulling exterior handle 26 (FIG. 6C) so that the door opens outward. No. 1 door 20 may also include a push bar 25 (FIG. 6C). The interior No. 2 door 30 is normally in the closed position 31, but may be brought to an opened position 32 by pushing push bar 35 (FIG. 6D) so that the door opens outward into the interior 16 of the secured facility. No. 2 door 30 may also include a handle 36 (FIG. 6D) on the "interior" side of the door which the operator may use to manually open No. 2 door 30 after it has been release by the control panel or other means. Within the entrance chamber 12 is a metal detector 60 located approximately half way between the No. 1 door 20 and No. 2 door 30. The entrance chamber 12 may also include other sensors such as photo-cells 70 and a laser source 84.

Entrance access is controlled by the entrance chamber 12 so that only one person at a time may access the secured facilities or structure. Normally, the outer or exterior No. 1 access door 20 is unlocked until someone enters and stands on the first Mat 90 also designated Mat A, which triggers the system to lock and secure No. 1 door 20 in the closed position 21 and prevents No. 1 door 20 from being opened from the exterior 18 of the secured environment. The person then proceeds through the metal detector 60 and onto mat 92 (Mat B). If no metal is detected, the person simply opens No. 2 door 30 and enters the interior 16 of facility without any intervention from the operator.

If metal is detected, the inner No. 2 door 30 is locked and a metal detector alert 135 such as a pulsating audible is sounded or a flashing LED is triggered on the control panel 110 (also see FIG. 3). At this point, there are several options, the person can return to the outer entry door 20 and leave the chamber 12 freely or the operator may push a button 130 (FIG. 3) to release the No. 2 door 30. The operator may also decide to toggle the No. 1 control panel door switch 121 "up" which will trap the person in the chamber 12, not allowing access or egress. This scenario may be used when someone is brandishing a weapon and the police are being called.

If two people enter chamber 12 through the No. 1 door 20 and one of them stands on the outer mat 90 and the other stands on the inner mat 92, the inner entry door 30 will not open. If one of the persons tries to stand on the mat by straddling and putting his feet on the aluminum or other suitable material framing 74 (see also FIG. 6B) a set of photo-cells 70 will detect the feet on the framing 74 and will not allow No. 2 door 30 to open. One of the persons must exit the chamber 12 and may return only when the first person exits the entrance chamber 12.

If a person enters through the No. 1 door 20 with a weapon, activates the metal detector 60, and leaves the weapon on inner entry mat 92 and walks back out a sensor device such as laser/infrared system (72 and 74) will detect the weapon on one of the floor mats (90 or 92) and prevent the No. 1 door 20 from opening until the chamber 12 is inspected and the weapon removed.

FIG. 8B shows the entrance chamber metal detector mode of operation in block diagram form. The interface is triggered when a person opens door No. 1 and enters the entrance chamber 12 as indicated by block 506. The person then proceeds through the metal detector 60, see block 507. If no metal is present, the alarm does not sound, see block 513 and the person pushes the bar to release the lock on the inner entry door 30 and enters the secured facility as indicated by block 514. If metal is present, the alarm is triggered, per block 508 by the metal detector. The system may be configured to allow him to leave the weapon on mat B, push the bar to release the lock No. 1 door 20 and exit the entrance chamber to the exterior of the secured facility, see block 509. If the person in the entrance chamber is an identified law enforcement officer, is a disabled person in a wheelchair, or is otherwise identifiable to the operator 510, the operator may release the No. 2 door 30 per block 511 and thus allow the person to push the bar to release the lock on inner entry door 30 and enter the secured facility as indicated by block 512.

FIGS. 8C and 8D show the mode of operation on the entrance chamber interlocking door system in block diagram form. When nobody is using the doors or is inside the entry chamber 12, the No. 1 outer entry door 20 may be opened and a person may enter the entrance chamber as indicated 515. When the person steps on mat A per block 516, a signal is sent to lock No. 1 door 20, per block 517 so it is secure and cannot be opened from the outside. The person then passes through the metal detector and proceeds onto mat b, see block 519, the person may open the inner No. 2 entry door 30 and enter the secured facility 520, as indicated by block if the metal detector is not activated. If outer No. 1 entry door is unlocked and no one is on mat A per block 521, and door No. 2 remains locked, then door No. 1 locks, per block 523 and the person may open inner No. 2 entry door 30, and enter the secured facility, per block 524.

However, if two people enter through door No. 1 and one of them stands on mat A and the other stands on mat B, door No. 2 will not open. If one of the persons tries to stand off the mat by straddling and putting the feet on the aluminum framing, see block 525, a set of photo-cells or other sensors will detect the feet on the framing and will not allow door No. 2 to open, per block 526. In this case the operator may request the second person to exit through door No. 1 as indicated by block 527. The person remaining in the entry chamber 12 may then open door No. 2 and enter the secured facility per block 528. Finally, as shown in FIG. 8D, if no one is inside the chamber, but a weapon is on mat B, per block 529, the sensor system will detect the weapon and keep door locked in accordance with block 530 until operator inspects the chamber and removes the weapon, see block 531. A person may then push open outer entry 1 and enter the entrance chamber, per block 532.

Figure 5B:
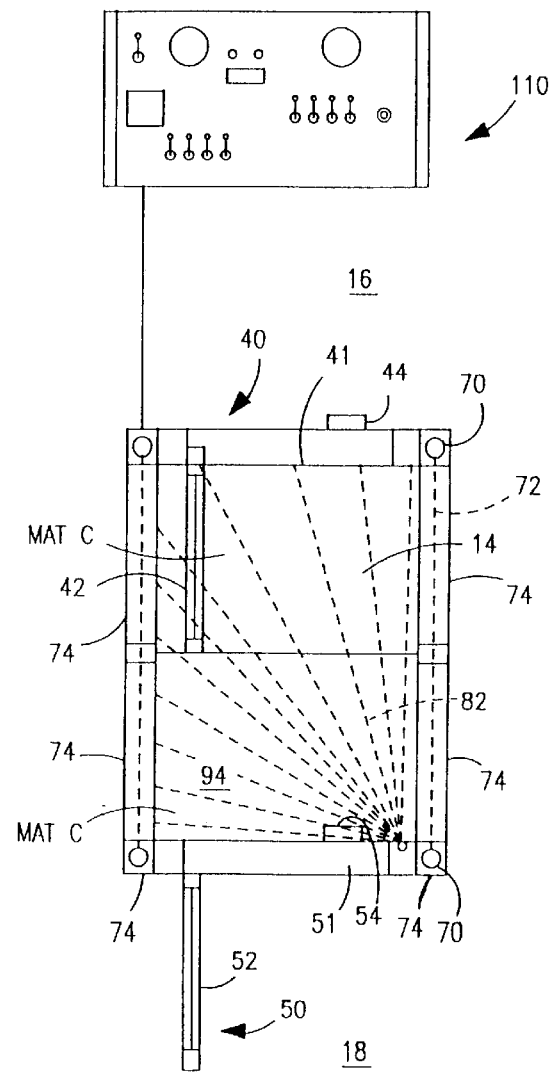
FIG. 5b is a schematic diagram of the exit chamber interlocking doors system.

FIG. 5B is a schematic diagram of the exit chamber 14 with its interlocking door system which controls egress from the secured facility. The exit chamber has two doors 40 and 50 on either end of the chamber which also preferably have electromagnetic locks (44 and 54) and touch bars (45 on FIG. 6D and 55 on FIG. 6C) mounted. The interior No. 3 exit door 40 is normally in its closed position 41, but may be brought to an opened position 42 by activating the touch bar 45 (FIG. 6D) so that the door opens inward into the exit chamber 14. The exterior No. 4 exit door 50 is normally in its closed position 51, but may be brought to an opened position 52 by pushing push bar 55 (FIG. 6C) so that the door opens outward towards the exterior 18 of the secured facility. The exit chamber 14 may include sensors such as photo-cells 70 and laser source 80.

Exiting the facility is accomplished by simply pushing the No. 3 door 40. If the chamber 14 is empty and No. 4 door 50 is closed, the person or persons are free to enter the chamber 14. Once in the chamber 14, mat C 94 will detect the person's presence, locking door No. 3 40 once the door closes, thus preventing re-entry or additional people from entering the chamber 14. The person then must activate the push bar 55 (FIG. 6C) to unlock No. 4 door 50 and exit the chamber 14.

If robbery occurs, the tellers are provided with a switch 181 (FIG. 4B) that will lock outer No. 4 exit 50 and trap the person in the chamber 14, not allowing egress. Doors 3 and 4 may also be locked from the control panel using the switches marked "3" and "4" (123 and 124) on FIG. 3).

If the person tries to stand off mat C, reference numeral 94 by straddling and putting his feet on the aluminum framing 74 (FIG. 6B), a set of photo cells 70 will detect the feet on the framing 74 and will prevent the No. 3 inner exit door 40 from opening.

If a person enters the chamber 14, leaves a weapon on mat C, reference numerals 94, and returns to the interior 16 of the secured facility, a laser/infrared system (80 and 82) will detect the weapon on the floor, not allowing No. 3 inner exit door 40 to open until the chamber 14 is inspected and the weapon removed.

FIGS. 8E and 8F are block diagrams of the mode of operation of the exit chamber 14 interlocking door system of the present invention. As shown in FIG. 8E when there's nobody using the doors or inside the chamber, doors No. 3 and No. 4 are secured as shown by block 533. When somebody is leaving the secured facility and touches the electronic bar on door No. 3, the lock is release see block 534. As the person steps on mat C per block 535, a signal is sent to lock door No. 3, per block 536 so that it cannot be opened from chamber 14. The person then can open door No. 4 by activating the push bar to release the lock and exit the secured facility in accordance with step 537.

As shown in FIG. 8F, if the person tries to defeat security by standing off the mat by straddling and putting his feet on the aluminum framing, or by laying a weapon on the floor, per block 538, a set of photo cells or other sensors means will detect these circumstances, and a signal will be sent tot prevent inner exit door No. 3 from being opened, per block 539. An operator may then inspect the chamber, request the person to exit through door No. 4, or remove the weapon, per block 540. A person may then push the bar on door No. 3 to release the lock 541. As the person steps on mat C, per step 542, a signal is sent to lock door No. 3 543 so that it cannot be opened from within chamber 14. The person then can opened door No. 4 by activating the push bar to release the lock and exit the secured facility, in accordance with step 544.

In the preferred embodiment, electromagnetic locks (24, 34, 44, and 54) would be positioned on the top frame of the ACU as shown in FIGS. 5A and 5B. The locks would come into contact with a magnetic strike plate (not shown) on the corresponding top frame of the door. When activated, the electromagnetic locks would secure the doors. When released, the electromagnetic locks would allow the doors to open. An electromagnetic access control circuit such as that described in U.S. Pat. No. 4,682,801 to cook et al. and assigned to Securitron-Magnalock Corporation would be appropriate to use with the present invention. A magnetic locking status detection system such as the one described in U.S. Pat. No. 4,516,114 to Cook and assigned to Securitron-Magnalock Corporation could be used to connect the electromagnets to the microprocessor 400 (FIG. 7) and provide status information.

Figure 6A:
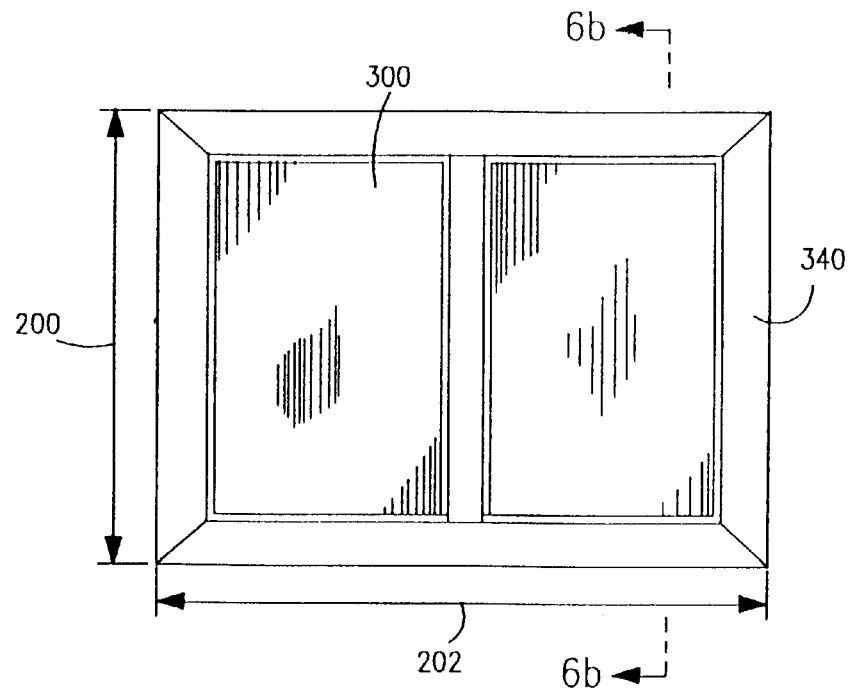
FIG. 6a is a schematic top view of the ACU of FIG. 2.
Figure 6B:
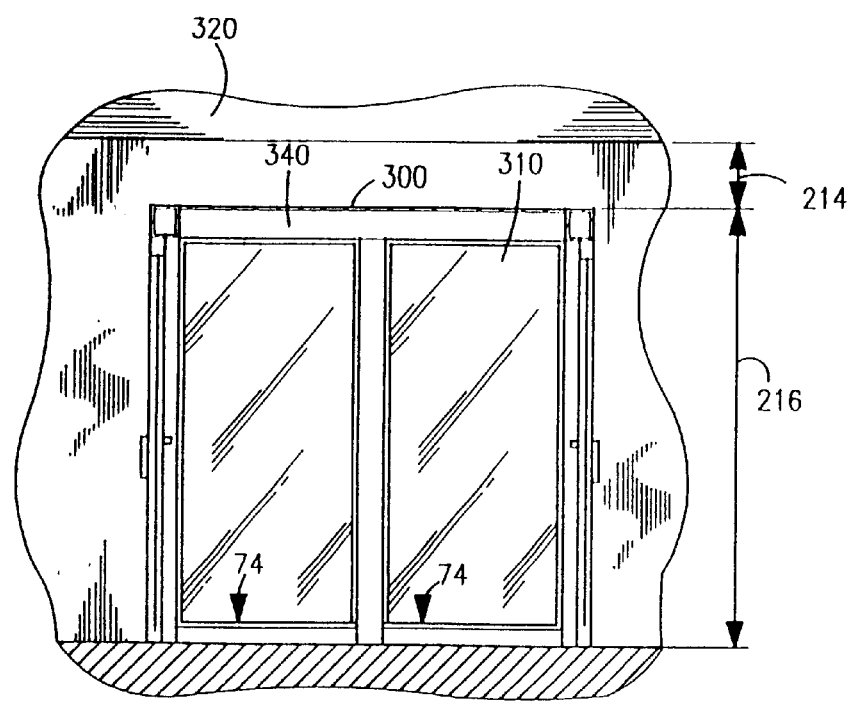
Figure 6C:
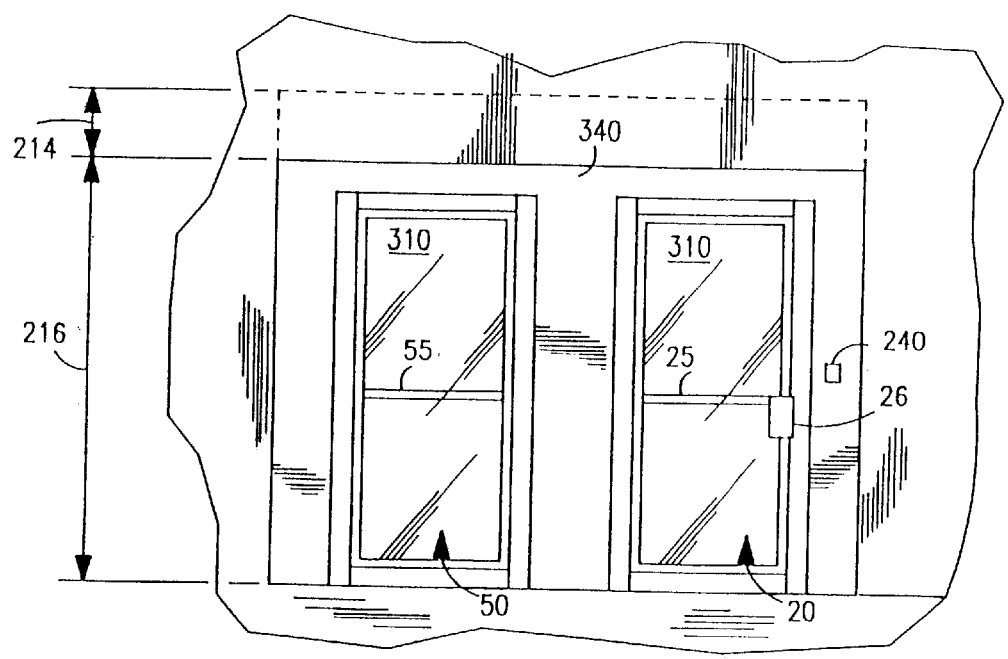
FIG. 6c is a schematic exterior view of the ACV.
Figure 6D:
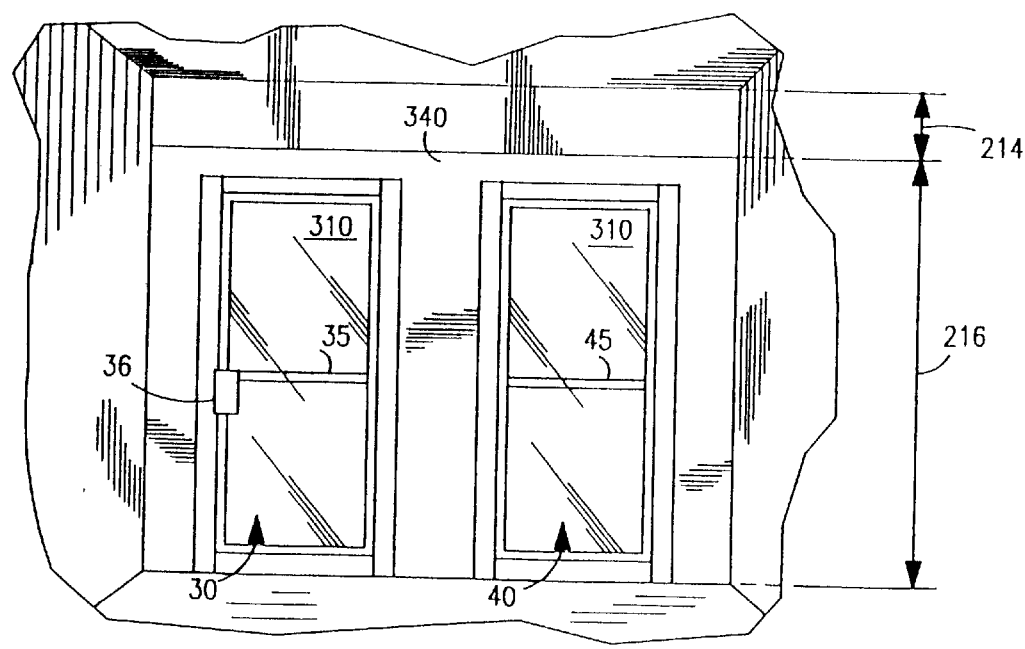
FIG. 6d is a schematic interior view of the ACV.

The touch bars (25,35,45, and 55) as shown in FIGS. 6C and 6D may be part of a touch bar release locking system of the type described in U.S. Pat. No. 4,871,205 to Cook et al. and assigned to Securitron-Magnalock Corporation.

FIG. 6A is a schematic diagram of the preferred embodiment taken from the top view. The top panel cover 300, including the framing 340, has a length 200 of approximately 7 feet 5½ inches and width 202 of approximately 8 feet 3 inches. As shown in FIG. 2, the width 200 includes corner framing (204 and 212) of approximately 9¾ inches, doorways (206 and 210) of approximately 36 inches, and a central framing 208 of approximately 7½ inches. FIGS. 6B–D show that the preferred height 216 of the ACU 10 is approximately 7 feet and 4 inches. The clearance 214 between the top panel cover 300 and the ceiling 320 is preferably at least 2 feet and 0 inches. It may be noted that the floor for accommodating the ACU is preferably level within approximately ±¼ inches. The ACU may be positioned so that the face of the building is flush with the front of the ACU, flush with the back of the ACU. It should be noted that these dimensions are meant to be exemplary and may be adapted to correspond with specific needs of a user. In passing, it is noted that regulations relating to disabled persons, using wheelchairs, require that the length of the entrance chamber 12 and exit chamber 14 be at least seven (7) feet, and that the width of the chambers be 36 inches.

FIGS. 6A–6D also show one embodiment of the framing system 340 of the ACU 10. The framing system 340 supports several glass or high strength transparent plastic panels 310. Both the framing system 340 and the glass panels 310 are made of materials which are preferably extremely strong and bullet proof glass or plastic to allow complete visual access to the ACU 10. The access chamber is formed of aluminum framing along all the sides of the box-shaped chamber. The framing secures the glass and plastic panels in the sides and doors such that the inside of the chamber is almost completely visible from the outside. Using the same material for the side walls and doors significantly reduces the cost of the access control chamber and makes it easier to manufacture and install. An assemblyman needs only a basic knowledge of assembling the frame members with the glass panels secured within the framing.

FIG. 6B shows a side view of the access chamber in which the sides are formed of two pieces of glass and separated by a vertical frame member. Using two sections instead of one large piece of glass is beneficial, since the smaller sections are lighter than the larger one which allows for manual installation of the glass. No power equipment is required as would be for a piece over 8 feet long and 7 feet high. Also, the middle frame section provides more structural support to the entire access chamber than would the single glass piece as shown in the Urbano patent. Also, if the glass was to be broken due to a fired bullet, only the one damaged glass piece would need to be replaced instead of the whole side section as would be required in the Urbano patent.

Figure 6E:
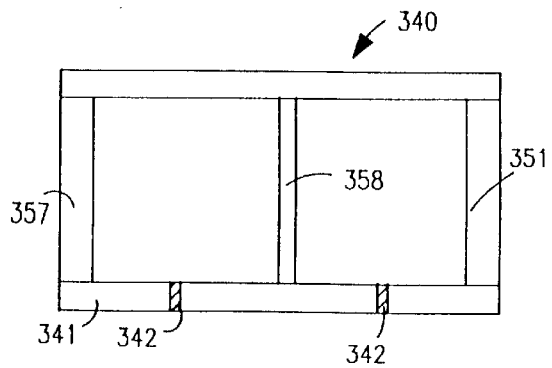
FIG. 6e shows a side view of the ACV frame having cut sections on the bottom pieces having an insulated connection member between the cut section.

FIG. 6e shows a side view of the frame 340 of the access control unit. A bottom section 341 of the frame has a cut section with a piece of insulation 342 secured therein. The metal detector 60 is located near a vertical frame member 343 located at a mid-point of the frame from the entrance door to the exit door. The frame section is cut so that a closed electrical loop is not created in the frame section. The insulation is placed in the cut section in order to provide a rigid connecting member between the cut section. Preferably, the insulation member is a hard plastic that has a high modulus of elasticity to give the connection rigidity.

Figure 6F:
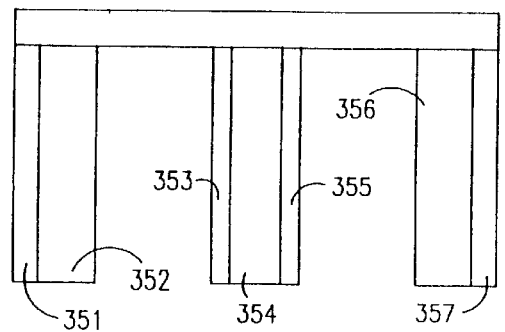
FIG. 6f shows a front or back view of the ACV with two door frames.
Figure 9:
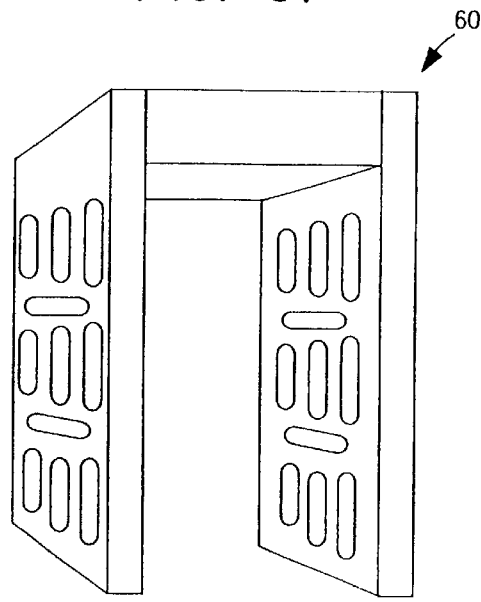
FIG. 9 shows the metal detector unit having several coils arranged along zones.

FIG. 6f shows a front section of the vestible (or rear section since they are the same).

Figure 7:
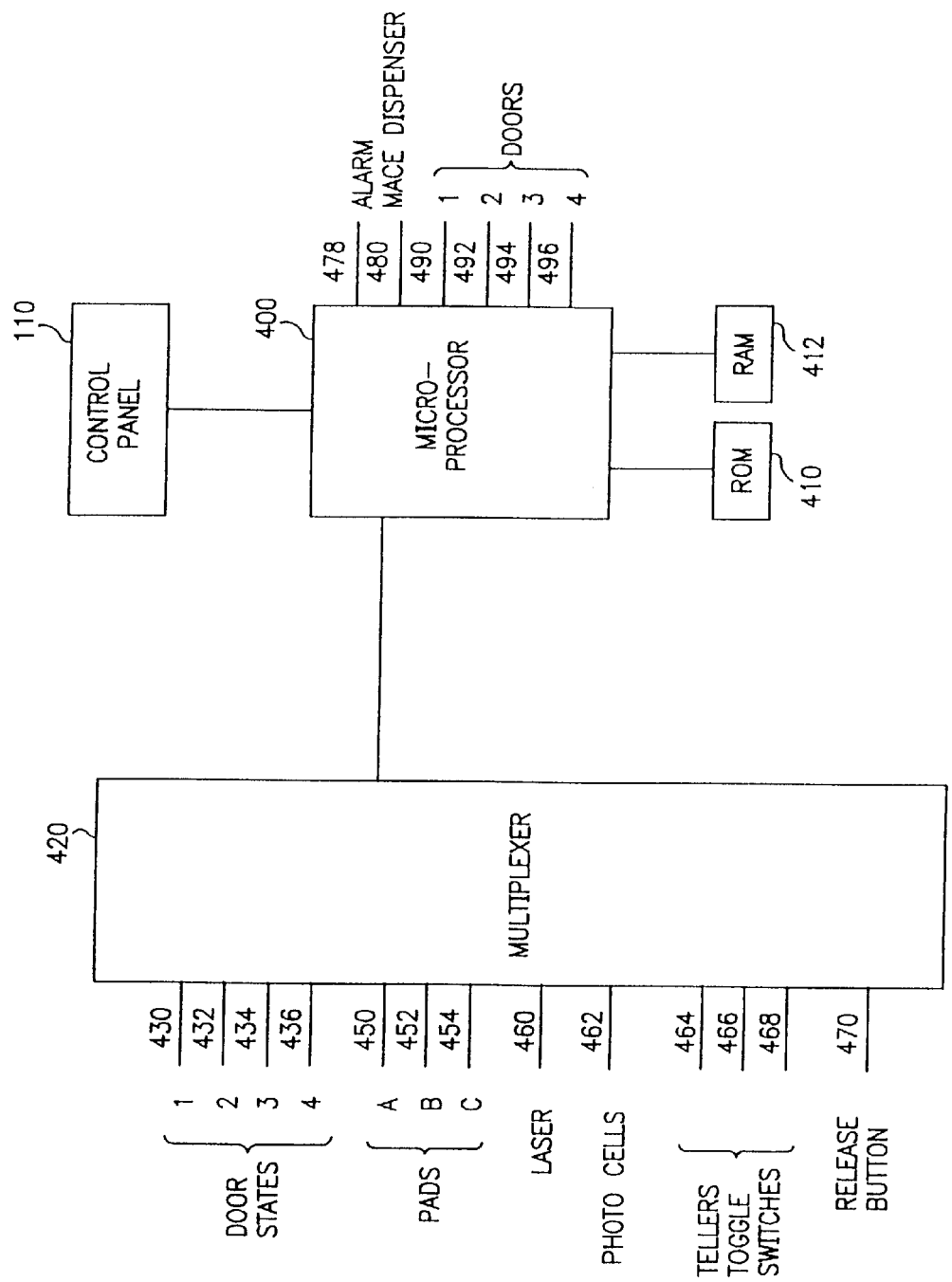
FIG. 7 is a block circuit diagram of one embodiment showing the electronic connections of the access control system.

FIG. 7 is a block circuit diagram of a simplified embodiment of the electronic connections of the present invention. The system would be controlled by a microprocessor 400 which includes or is attached to memory such as [Reed-Only Memory] read-only memory (ROM) 410, and Random Access Memory (RAM) 412. The microprocessor 400 would receive input, generally supplied through a multiplexer 420, from various elements of the ACCSS. This input could include, but is not limited to the input circuits providing the status of the control panel 110 each of the doors (430, 432, 434, and 436), each of the mats (450, 452 and 454), the laser or sensor system 460, the photo cells 462, the tellers toggle switches (464, 466, and 468) and a wireless door release button 470. The microprocessor controls elements of the system including, but not limited to the alarm 478, a MACE dispenser 480, and each door (490, 492, 494, and 496) in accordance with the operational diagrams of FIGS. 8A through 8J.

FIG. 8H is a block diagram of the operation of the entrance chamber camera system interface which may be included in the present invention. More specifically, a closed circuit TV system may work in conjunction with the ACCSS to provide a record of people that activate the metal detector 60. The camera system (as shown schematically in FIG. 2) may include a camera 230 installed at the entrance chamber 12, a time lapse security video recorder 232, and a monitor 234. The camera system is activated by the metal detector 60 or by the control panel 110. If a signal is sent from the control panel or metal detector 60 as indicated by block 553, the time lapse security VCR per block 552 requests and receives an image from the camera as indicated by block 551. The time lapse provides the image to the video monitor as indicated by block 554.

Figure 8I:
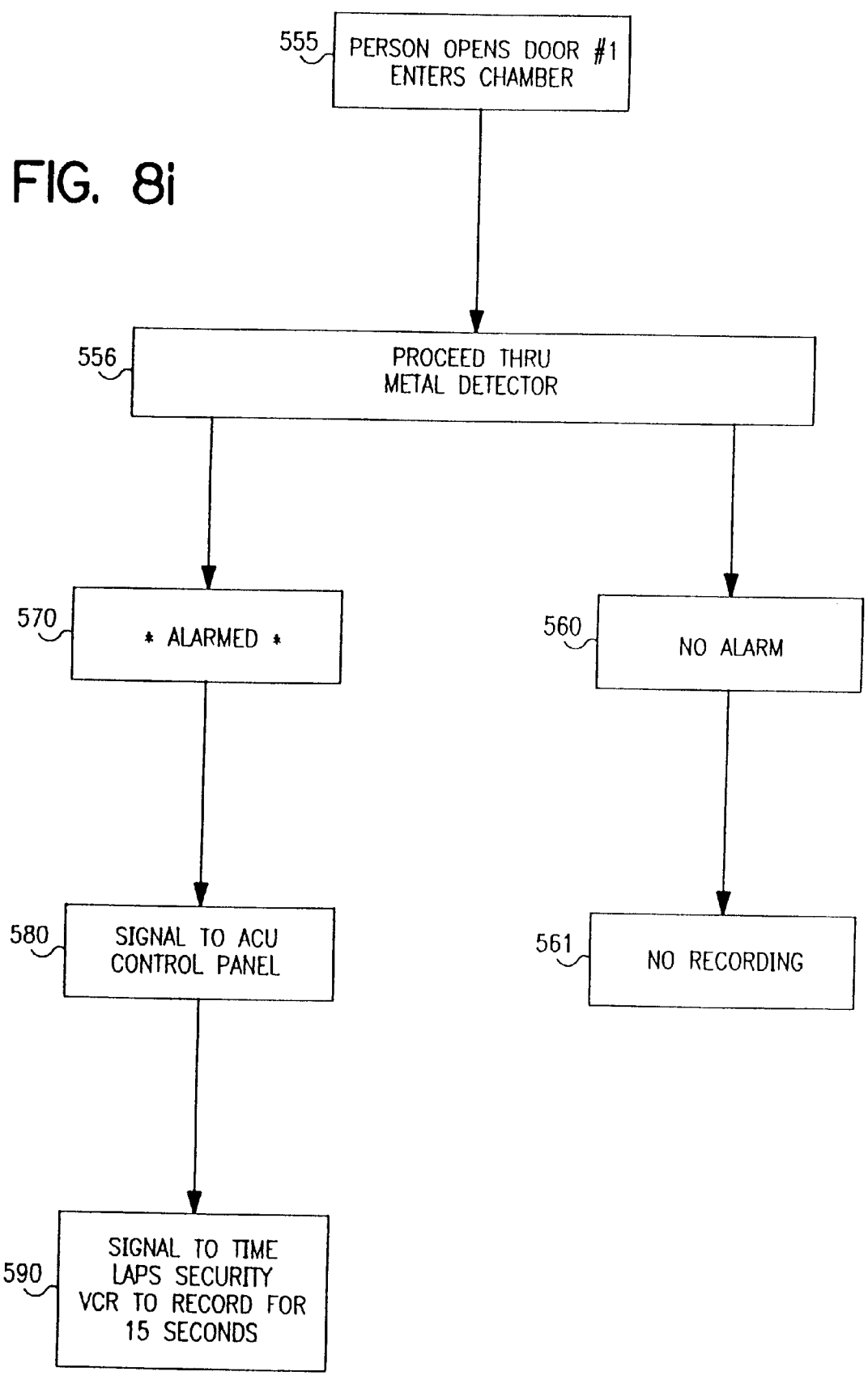
FIG. 8*i* is a block diagram of the entrance chamber metal detector system interface of the system.
Figure 8K:
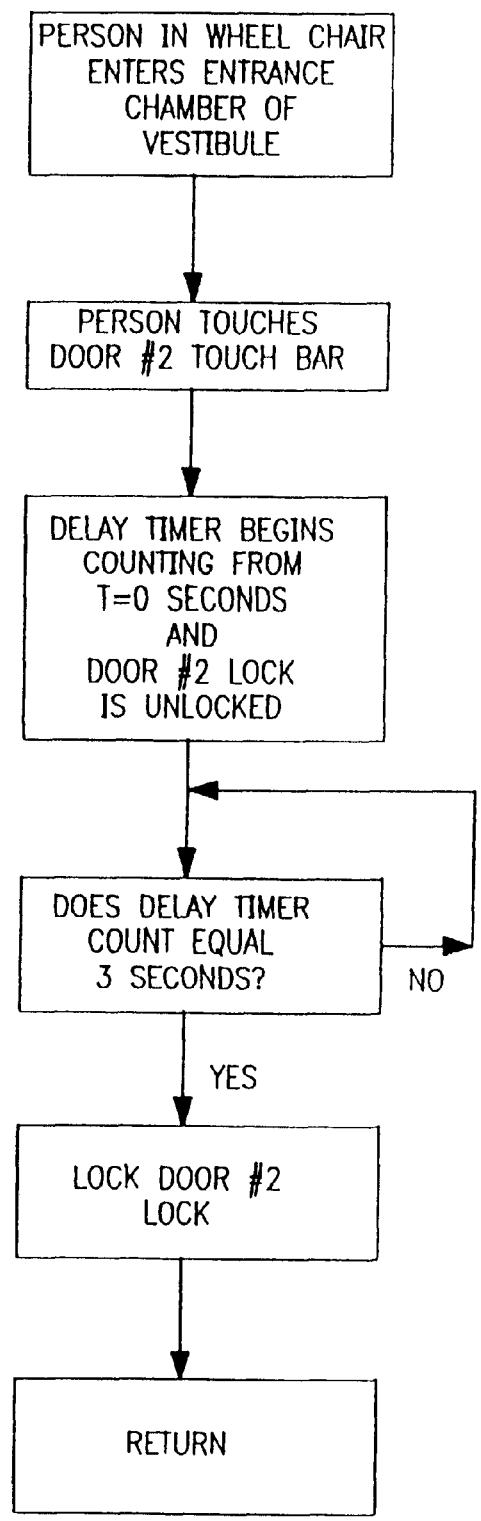
FIG. 8*k* shows a block diagram of a three second time delay from when the push bar of door #2 is pushed and the magnetic lock is unlocked until when the magnetic lock is re-locked.
Figure 10A:
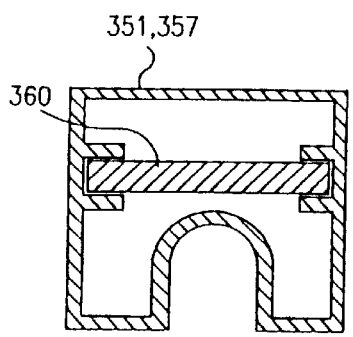
FIGS. 10*a–d* show cross sections of the 4 vertically oriented aluminum frame members with a ballistic fiberglass panel secured inside each of the frame members.
Figure 10B:
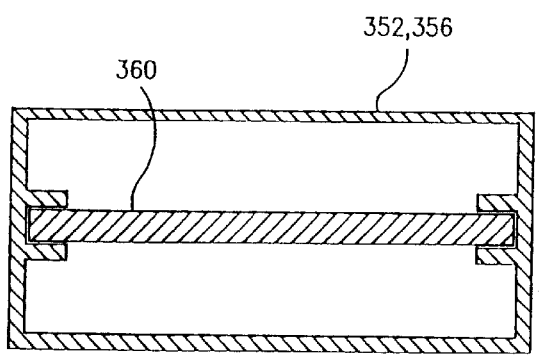
Figure 10C:
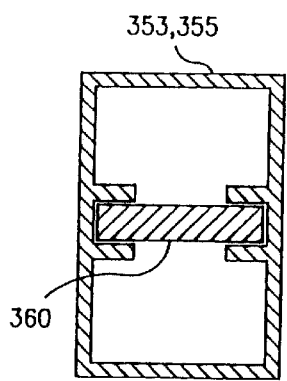
Figure 10D:
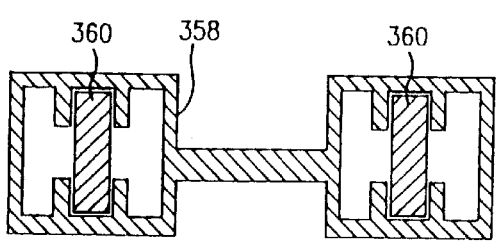
Figure 13:
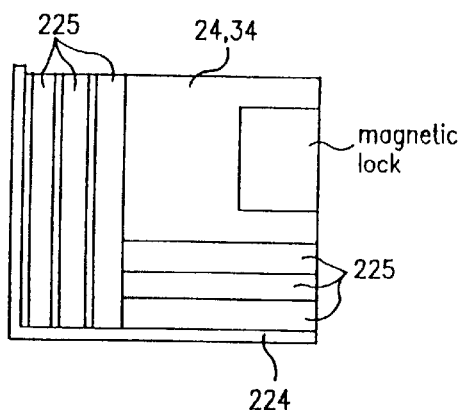
FIG. 13 shows a bullet resistant box having several metal plates which covers the magnetic lock.

FIG. 8I is a block diagram setting forth the mode of operation of the entrance chamber metal detector system as it interfaces with the camera system. A person enters the entrance chamber 12 as indicated at block 555 and proceeds through the metal detector, see step 556. When the metal detector is activated or alarmed as shown at block 557, it sends a thickness. The number of plates used depend upon the type of bullet the protective box is meant to provide. For example, 2 plates will stop a 38 caliber special for a level 1 security system, 3 plates will stop a 9 mm or 357 magnum bullet for a level 2 system, and 4 plates will stop a 44 magnum bullet for a level 3 system, the plates prevents a gunman from shooting out the magnetic locks by shorting the wiring inside the box. When power is lost to the magnetic locks, the locks are disabled.

Figure 14:
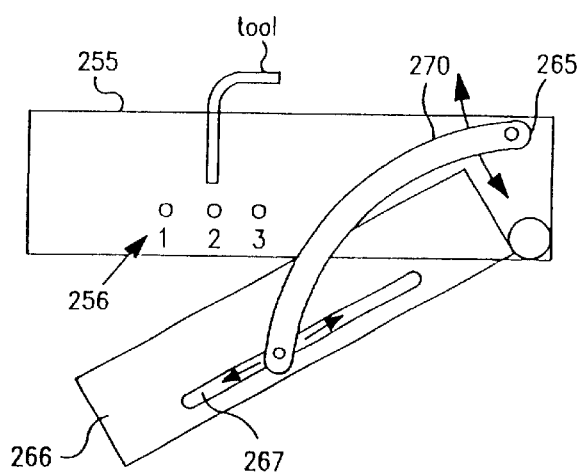
FIG. 14 shows a door with a high-security closing mechanism, and a special tool required to adjust the mechanism.

FIG. 14 shows one of the doors in which a high security closing mechanism is used. The door closer 255 uses a hydraulic cylinder to rotate a pin 265 and control the swinging of the door 266. A solid cast iron arc-shaped bar 270 is used to transmit rotation of the pin 265 to the swinging of the door 266. The bar 270 has at the door end a pin which rides along in a groove 267 on the top of the door 266. Since the bar 270 is solid and without an elbow typical of other door closers, it cannot be pulled by a person in the door passage and bent or damaged. A special tool such as a special allen wrench 268 fit inside each of three holes 256 of ⅜ inch diameter on the door side of the door closer 255 in order to adjust the back stroke of the door (the force needed to push open the door), the speed of closing the door, and the latch speed of the door (the speed of closing in the last three inches of travel). This mechanism does not include an elbow joint, and thus a person can not place of stick-like object in the closer to hold the door open. Also, the mechanism requires the use of a special tool to adjust or place the closer in a position that would hold the door open.

The present invention is preferably adapted for use with handicapped persons. For example, as shown in FIG. 6C, the ACU 10 is provided with a handicapped assistance push button 240 outside No. 1 door 20 is activated as indicated by block 562, an audible or visual signal is activated to advise the operator at the control panel that somebody needs assistance going through the entrance chamber 12, see block 564. The operator then using the control panel will assist the person. The block 563 indicates that the power supply 160 may provide the signal triggered by actuation of the switch 240. The operator may normally release the No. 1 and No. 2 doors if the handicapped person is recognized. If desired, the No. 1 and No. 2 doors (as well as the exit doors) may be powered, if desired, and may be operated by push-bars on the doors if other conditions are met.

The program steps or modes of operation are set forth in FIGS. 8A through 8J are implemented by the microprocessor 400 of FIG. 7 under the control of the Read Only Memory, or ROM 410 by which the program steps are implemented.

Figure 16:
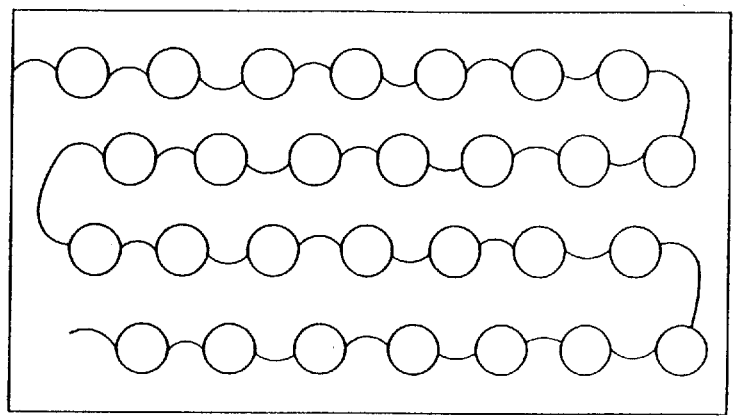
FIG. 16 shows a floor touch pad having a plurality of induction coils therein.

FIG. 16 shows a touch floor pad having a plurality of induction coils therein. The induction coils are preferably embedded within the rubber pads in order to seal them therein. Each induction coil is capable of detecting a magnetic field generated by a metallic material such as a weapon which is placed in the vicinity thereof.

Figure 17:
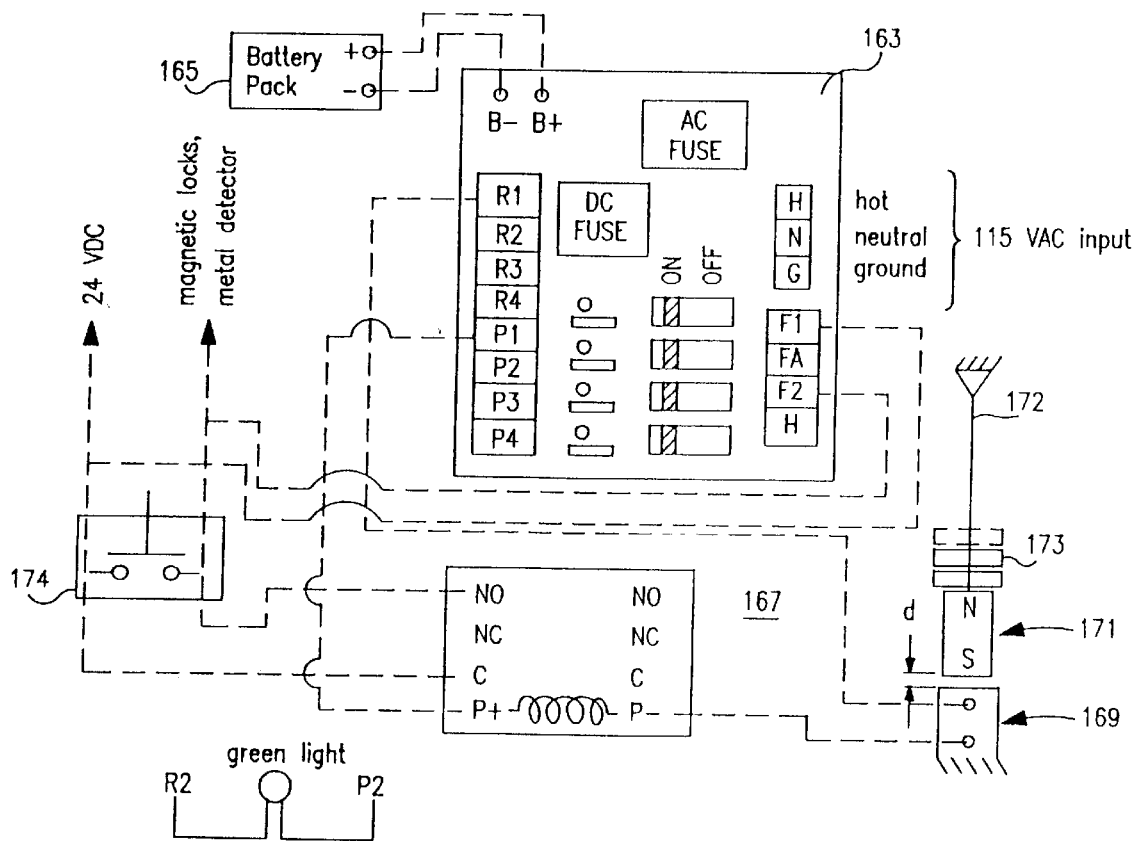
FIG. 17 shows the vibration sensor and its electrical connections to the power supply box and the relay switch.

FIG. 17 shows the vibration sensor (the seismic detector) connected to the fuses and connectors member 163 of the power supply box 160. The fuses and connectors member 163 is a well known part (serial number CCS-4) made by Securitron Magnalock Corporation of Sparks, Nev. Terminals F1 and F2 are—in the well known use of the member— connected to fire alarm normally closed contacts, and are opened when the fire alarm is activated. In the instant invention, the F1 and F2 connections are connected to a relay switch 167. The connectors R1–R4 are common negative DC return terminals, and P1–P4 are positive voltage supply terminals. The relay switch is a well known component, model number ASRB-1 made by Advanced Signaling Company of Arlington, Tex. The relay could also be RSBN-TTL ultra sensitive relay module of Advanced Electronic Technology of Brooklyn, N.Y. The operation of the relay will be discussed later.

A normally opened magnetic contact is used to detect for vibrations from an earthquake or bomb explosion. The magnetic contact is a well known device made by ADI of Syosset, N.Y., having model number SR-1075/8R. The contact consists of a magnet 171 and a contact 169. The magnet is suspended by a thin wire 172 so that a vibration will displace the magnet. The wire is preferably a thin wire that will allow the magnet 171 to swing easily. In the instant invention, a piece of fishing leader line is used because the steel wire is coated with a plastic to prevent the steel from rusting to premature. Once displaced, the contact closes and an electrical connection is made between the P negative terminal of the relay switch 167 and the R1 terminal of the fuses and connectors member 163. When this connection is made, the control panel provides that the magnetic locks are disabled in order that the doors are not locked and a person within the vestibule is not trapped within during the earthquake or explosion. The purpose of the relay switch 167 is to prevent the power from re-supplying the magnetic locks after the vibrations have stopped. If a bomb was to explode, when the vibration ceases, it is not desirable to re-lock the magnetic locks because people will still need to exit the building. The sensitivity of the magnetic contact can be adjusted by displacing the magnetic 171 from the contact 169, or by using a heavier magnet or adding weights to the magnet. Weights can be simple washers 173.

When the vibration sensor has been activated and the magnetic locks unlocked, power to the locks is restored after the reset switch 174 is depressed. When the vibration detection system is working and activated, the green light connected between terminals R2 and P2 is on. An operator when seeing that the green light is off, would know that to activate the vibration sensing system, the reset switch should be depressed so that the green light would be illuminated.

Figure 18:
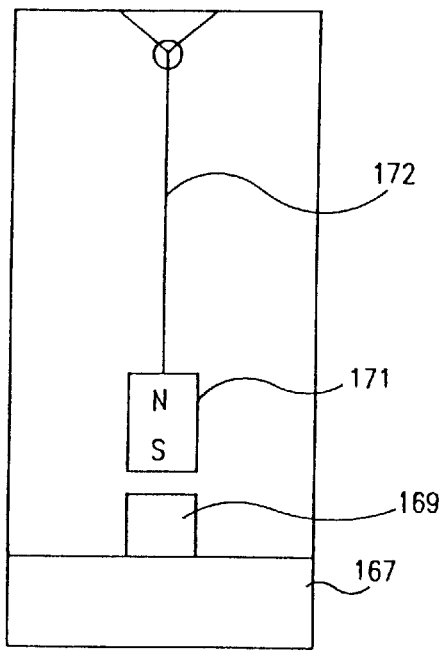
FIG. 18 shows the details of the vibration sensor or seismic detector.

The vibration sensor (or seismic detector) is preferably seated within a metal box as shown in FIG. 18. The relay switch 167 acts as a cap on the bottle of the box. The top is sealed off by a metal cap with the wire 172 hanging from the top.

The vibration sensor could also be an off-the-shelf type seismic detector, but this is a costly instrument. The preferred embodiment uses the vibration sensor because of its simplicity and low cost of obtaining off-the-shelf parts.

One of the disadvantages of a system having magnetic locks like the one in the european reference is that a robber could place a metal plate on the magnetic lock and fool the system into thinking that the entrance door is closed. The exit door could then be opened while the entrance door is still open because of the metal plate on the lock. A second robber could then throw a gun to the first robber as the later opens the exit door of the vestibule and enter the bank with the gun.

Figures 20A, 20B:
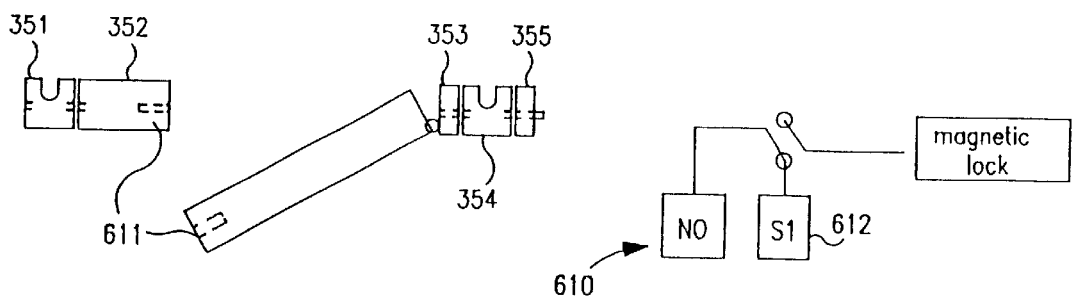
FIG. 20*a* shows a door with a magnetic contact switch mounted therein.
FIG. 20*b* shows the electrical circuit for the magnetic contact switch in FIG. 20*a*.

FIGS. 20a–b show the door frame having a magnetic contact assembly 610. The contact assembly is of the kind produced by Sentrol, Inc. of Tualatin, Oreg. series number 1075 contacts. The contact has two parts, a magnet and a contact switch. One part is mounted in the door frame while the other part is mounted in the main frame. When the magnetic is in close proximity to the contact, an electric connection is either opened or closed. The controller is electrically connected to the magnetic contact through a senstat terminal 612 at the control panel such that the controller can determine if the door is closed before allowing another door to be opened. Thus, a person could not trick the system by placing a metal plate against the magnetic lock and simulate closing of one of the doors, preferably, the door frame includes a series of five holes extending along its edge. Only one of the holes is used to receive a magnetic contact. This way, if a person did discover the use of the magnetic contact to prevent fooling the system, the would-be robber would need to tamper with all of the holes in order to find the one using the contact. The vestibules randomly use the holes to place the contact therein. One or more contacts could be used depending on the complexity of the system desired.

By way of example only, and not by way of limitations, the following companies may supply appropriate parts of the present invention. Securitron Magnalock Corp (550 Vista Blvd., Sparks, Nev. 89434, (702) 355-5625) produces a preferred embodiment of a Power Supply (3 amp., BPS-24-3), Magnetic Lock (1,200 pds, M62S-24), Magnetic Lock (800 and, M32S-24), Touch Sense Bars (TSB-1), Control Panel (LCP-8-42), Second Operator Button (PB2, Nova, Custom Deck), and ADA Assistance Push Button (PB-2). EG&G Astrophysics Research Corporation (4031 Via Oro Avenue, Long Beach, Calif. 90810, Phone (800) 869-1411) produces a preferred embodiment of the Metal Detector Electronic Components (01-0205-01, Sentries AT Telem Kit). Viracon (800 Park Drive, Owatonna, Minn. 55060, Phone: (800) 553-2080) produces preferred embodiments of Bullet Resistant Glass Level 1 (Guard Vue 100) and Bullet Resistant Glass Level 2 (Guard Vue 300), Lanson Industries (PO Box 906, S82 W18717 Gemini Drive, Muskego, Wis. 53150, Phone: (414) 679-0045) produces a preferred embodiment of the Contact Metal Plates Rubber Mats (146575). L.C.N. Closers (P.O. Box 100 Princeton, Ill. 62355-0100, Phone: (815) 875-3311) produces preferred embodiments of Left Hand Concealed Door Closer (2033 Closer CYL-SR1 LH) and Right Hand Concealed Door Closer (2033 Closer CYL-SRT RH). Grand Central Engineering are distributors for Watec America Corporation, BYRR. Rainbow Lenses and Sanyo (11181 S Rogers Circle, Suite 21, boca Raton, Fla. 33487, Phone: (407 994-0881) and therefore can provide preferred embodiments of a Watec Video Camera (WAT-501-EX). Time Lapse Video Recorder (GYRR TLC 1824). Rainbow Camera Lens (H3.5 mm, 1.1.6E-11). Sanyo Video Monitor (VM 5009). The William L. Bonnell Co. (25 Bonnell Street, Newman, Ga. 30263, Phone: (404) 253-2020) produces preferred embodiments of the Access Control Unit Aluminum Framing), Optex (U.S.), Inc. (365 Van Ness Way, Suite 510, Torrance, Calif. 90501, Phone: (310) 212-7271) produces a preferred embodiment of a Photocell Safety Beam Switch (OS-2C) Interactive Light, Inc. (Phone: (310) 268-2718) produces a preferred embodiment of a Infrared Detection System. These parts are meant to be exemplary and are not intended to limit the scope of the invention.

In conclusion, it is to be understood that the present invention is not to be limited to that precisely as described herein and as shown in the accompanying drawings. More specifically, the invention could be adapted to provide security for any secure area such as a bank vault, jewelry store, prison, or other security buildings. Additional handles and push bars could be added or the manual pull handle may be replaced with an electrically activated automatic system for opening the doors when access or egress is permitted. It is further noted that the functions as shown in FIGS. 8A through 8J may readily be implemented using hand wired relay or transistor circuits instead of the microprocessor implementation described herein. Also, instead of floor contact pads, other detection arrangements may be provided to determine the location of persons within the entrance and exit chambers. Further, the entrance chamber as disclosed herein may be employed to control access to the secured area, and other exit-only arrangements may be provided, for example, of the general type used is subway exits using a one-way revolving door type assembly having interlocking bars to prevent entry. Accordingly, the present invention is not limited to the arrangements precisely as shown and described herein.

What is claimed is:

1. An access control vestibule, comprising:

a metal frame including a side wall frame section;

the side wall frame section comprising a cutout section;

the side wall frame section comprising a first portion and a second portion;

an entrance door and an exit door mounted on opposite ends of the access control chamber to permit access into and exiting from the access control chamber;

lock means for locking both of the doors;

the metal frame defining an access control chamber;

a metal detector disposed to detect metal within the access control chamber;

a bullet resistant transparent glass mounted in the side wall frame section;

control means for preventing both doors from being opened at the same time;

said control means being operatively connected to said lock means to control locking and unlocking of both doors;

seismic detector means for determining if an earthquake or an explosion is occurring;

the seismic detector means being operatively connected to the control means; and whereby upon the seismic detector means determining that an earthquake or an explosion is occurring, the control means unlocks both doors.

2. The access control vestibule according to claim 1, further comprising:

the metal frame including a plurality of hollow frame members; and a ballistic fiberglass panel disposed essentially entirely within the hollow section of the metal frame members.

3. The access control vestibule according to claim 2, further comprising:

an insulated member secured in the cutout section to physically connect the first portion to the second portion, and to electrically insulate the first portion from the second portion; and the side wall frame section and the insulated connecting member in combination being configured to form an open electrical loop in the side wall frame section.

4. The access control vestibule according to claim 3, further comprising:

the metal detector comprising at least one plurality of zoned coils arranged along a plane of the detector; and each of the coils of the at least one plurality of zoned coils being configured and disposed to detect a magnetic field from a specified area within the access control chamber.

5. The access control vestibule according to claim 4, further comprising:

the entrance door and the exit door both being manually operated;

touch pad means located on the exit door;

unlock means for unlocking the lock means on the exit door;

the unlock means being operatively connected to the lock means and to the touch pad means, wherein the unlock means is configured to deactivate the lock means and unlock the exit door when the touch pad means is activated by a person; and control means for providing a three second time delay from the time the touch pad on the exit door is initially activated until the lock means on the exit door is reactivated to lock the exit door.

6. A method of operating an entrance way, said entrance-way comprising:

a metal frame;

at least one door to permit access through said entrance-way;

lock means for locking said at least one door;

a bullet resistant glass mounted in said entranceway;

control means for preventing said at least one door from being opened;

said control means being operatively connected to said lock means to control locking and unlocking said at least one door;

vibration sensing means for determining if an earthquake or explosion is occurring;

said vibration sensing means being operatively connected to said control means; and whereby upon said vibration sensing means determines that an earthquake or an explosion is occurring, said control means unlocks said at least one door; and said method comprising the steps of:

preparing to sense, using said vibration sensing means, occurrence of an earthquake or explosion;

sensing, using said vibration sensing means, an earthquake or explosion upon occurrence of an earthquake or explosion;

unlocking said at least one door, using said control means, when said vibration sensing means determines that an earthquake or explosion is occurring; and activating said control means for preventing said at least one door from being opened.

7. An entranceway, comprising:

a metal frame;

said metal frame defining at least one door;

said at least one door being configured to permit access through said entranceway;

a metal detector disposed to detect metal;

a bullet resistant transparent glass mounted in said entranceway;

lock means for locking said at least one door;

control means for preventing said at least one door from being opened;

said control means being operatively connected to said lock means to control locking and unlocking of said at least one door;

seismic detector means for determining if an earthquake or explosion is occurring;

said seismic detector means being operatively connected to said control means; and whereby upon said seismic detector means determining that an earthquake or an explosion is occurring, said control means unlocks said at least one door.

8. The entranceway according to claim 7, further comprising:

said at least one door comprising an entrance door and an exit door;

an access control chamber formed between said at least one door;

the metal detector is located between the entrance door and the exit door;

the metal frame comprises a plurality of hollow metal frame members; and a ballistic fiberglass panel disposed essentially entirely within the hollow section of the metal frame members.

9. The entranceway according to claim 8, further comprising:

said metal frame including a side wall frame section;

the side wall frame section comprising a cutout section;

the side wall frame section comprising a first portion and a second portion;

an insulated member secured in the cutout section to physically connect the first portion to the second portion, and to electrically insulate the first portion from the second portion; and the side wall frame section and the insulated connecting member in combination being configured to form an open electrical loop in the side wall frame section.

10. The entranceway according to claim 9, further comprising:

the metal detector comprising at least one plurality of zoned coils arranged along a plane of the detector; and each of the coils of the at least one plurality of zoned coils being configured and disposed to detect a magnetic field from a specified area within the access control chamber.

11. The entranceway according to claim 10, further comprising:

the entrance door and the exit door both being manually operated;

touch pad means located on the exit door;

unlock means for unlocking the lock means on the exit door;

the unlock means being operatively connected to the lock means and to the touch pad means, wherein the unlock means is configured to deactivate the lock means and unlock the exit door when the touch pad means is activated by a person; and control means for providing a three second time delay from the time the touch pad on the exit door is initially activated until the lock means on the exit door is reactivated to lock the exit door.

12. The entranceway according to claim 11, further comprising:

a magnetic contact assembly associated with the entrance door, wherein the control means determines through the magnetic contact assembly if the entrance door is closed.

13. The entranceway according to claim 12, further comprising:

a floor contact pad located on the floor inside the access control chamber;

control means for detecting if a person is standing on the floor contact pad;

a sealed chamber within the floor contact pad;

a metal contact plate disposed inside the sealed chamber of the floor contact pad; and an inert gas disposed to be sealed within the sealed chamber of the floor contact pad.

14. The entranceway according to claim 13, further comprising:

both doors having a metal frame structure;

said at least one door lock means comprising a magnetic lock associated with each door;

a bullet resistant cover for each of the magnetic locks, the cover comprising a thin outer cover member and a plurality of thicker metal plates, the plates being arranged between the outer cover member and the magnetic lock;

a metal exit door frame structure and a metal entrance door frame structure;

a corresponding closer member secured to each of the metal door frame structures;

a slot extending along a top portion of each of the metal door frame structures;

a rigid, arc-shaped bar;

the arc-shape extending over a substantial portion of the entire length of the bar; and the arc-shaped bar having one end rotatably secured to the corresponding closer member and having another end with a sliding member means, the sliding member means engaging the slot of the corresponding metal door frame structure, whereby a pivoting of the arc-shaped bar produces a movement of the corresponding door.

15. The entranceway according to claim 14, further comprising:

at least one door frame for said at least one door;

at least one continuous door hinge having a length substantially equal to the height of said at least one door frame;

wherein said at least one door frame, along substantially its entire height, is swingably secured to the metal frame by the continuous door hinge; and means for mounting the vibration sensing means onto the access control chamber.

16. The entranceway according to claim 15, further comprising:

control means for preventing both the entrance door and the exit door from being opened at the same time;

the vibration sensing means comprises:
- a pendulum arrangement connected at one end to a fixed frame;
- a magnet connected to the other end of the pendulum arrangement;
- a contact switch having either a normally opened position or a normally closed position; and
- wherein when the magnet is displaced, the switch reverses from its normal position; and a metal box enclosing the vibration sensing means, the metal box forming the fixed frame.

17. The entranceway according to claim 16, further comprising:
- the lock means being operatively connected to the control means;
- a touch floor pad located on a floor of the access control chamber;
- the touch floor pad comprising:
  - a plurality of induction coils; and
  - a rubber material disposed to at least substantially surround the plurality of coils;
- means for mounting the vibration sensing means onto said at least one door;
- control means for detecting if a magnetic field has been induced in at least one of the plurality of induction coils of the touch floor pad;
- the detecting control means being operatively connected to the touch floor pad;
- means for preventing the exit door lock from being unlocked when the detecting means detects a magnetic field;
- a power supply box; and
- mount means for mounting the vibration sensing means in the power supply box.

18. The entranceway according to claim 17, wherein the detecting control means is configured to detect if a magnetic field has been induced in at least one of the plurality of induction coils of the touch floor pad, by the presence of a weapon near the touch floor pad.

19. The entranceway according to claim 18, further comprising:
- the entrance door and the exit door each comprising a door frame structure;
- the entrance door structure and the exit door structures each being mounted to the metal frame;
- nitrogen comprising the inert gas; and
- wherein the metal frame comprises:
  - a left side outer corner post;
  - a left side inner corner post adjacent to the left side outer corner post;
  - a center post;
  - two side center posts adjacent to each side of the center post;
  - a right side outer corner post; and
  - a right side inner corner post adjacent to the right side outer corner post.

20. The entranceway according to claim 19, further comprising:
- the outer corner posts and the center post each having a concave portion in which is received an edge of a glass panel;
- the vibration sensing means comprising a seismic detector;
- at least one of said at least one door frame structures is mounted to either the inner corner post or the side center post;
- wherein the at least one door frame structure can swing with respect to at least one of the inner corner post and the side center post; and
- the inner corner posts and the side center posts each having a projection extending into one of said at least one door frame structures, wherein the projection is configured to provide a stop for the swinging movement of said at least one door frame structure.

* * * * *

UNITED STATES PATENT AND TRADEMARK OFFICE
CERTIFICATE OF CORRECTION

PATENT NO. : 6,298,603 B1  Page 1 of 1
DATED : October 9, 2001
INVENTOR(S) : William Diaz It is certified that error appears in the above-identified patent and that said Letters Patent is hereby corrected as shown below:

Title page,
Item [56], OTHER PUBLICATIONS, after "Quake Alarm Detector System" insert -- "Procedures And Materials Needed To Make A Cabin Compatible With A Metal Detector" CEIA USA Technical Training Folder 4 --.

Column 1,
Line 33, before the first occurrence of "to", delete "4,556,954" and substitute -- 4,656,954 --.

Column 16,
Line 37, after "An", delete "electromagnetic" and substitute -- electromagnet --.

Column 20,
Line 45, after "Components", delete "(01-0205-01" and substitute -- (01-0206-01 --.

Signed and Sealed this

First Day of April, 2003

JAMES E. ROGAN
*Director of the United States Patent and Trademark Office*